US012795175B2

(12) United States Patent
Zhang et al.

(10) Patent No.: US 12,795,175 B2
(45) Date of Patent: Nov. 10, 2026

(54) METHOD, APPARATUS, AND MEDIUM FOR VISUAL DATA PROCESSING

(71) Applicant: Bytedance Inc., Los Angeles, CA (US)

(72) Inventors: Zhaobin Zhang, Los Angeles, CA (US); Semih Esenlik, Los Angeles, CA (US); Kai Zhang, Los Angeles, CA (US); Li Zhang, Los Angeles, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 19/034,280

(22) Filed: Jan. 22, 2025

(65) Prior Publication Data

US 2025/0168412 A1 May 22, 2025

Related U.S. Application Data

(63) Continuation of application No. PCT/US2023/070433, filed on Jul. 18, 2023.

(60) Provisional application No. 63/369,219, filed on Jul. 22, 2022.

(51) Int. Cl.

| | |
|---|---|
| ***H04N 19/85*** | (2014.01) |
| ***H04N 19/186*** | (2014.01) |
| ***H04N 19/80*** | (2014.01) |

(52) U.S. Cl.

CPC ........... *H04N 19/85* (2014.11); *H04N 19/186* (2014.11); *H04N 19/80* (2014.11)

(58) Field of Classification Search

CPC ...... H04N 19/85; H04N 19/186; H04N 19/80; H04N 19/117; H04N 19/91; H04N 19/98; G06N 3/0442; G06N 3/0464; G06N 3/047; G06N 3/0475; G06N 3/0495; G06N 3/084; G06N 3/0455; G06N 7/01; G06T 9/002

USPC .................................................... 375/240.29

See application file for complete search history.

(56) References Cited

U.S. PATENT DOCUMENTS

| | | | | |
|---|---|---|---|---|
| 2020/0050963 | A1 * | 2/2020 | Tanaka | G06N 20/00 |
| 2020/0160546 | A1 * | 5/2020 | Gu | G06N 3/08 |
| 2021/0112258 | A1 * | 4/2021 | Li | H04N 19/159 |
| 2021/0211752 | A1 | 7/2021 | Rossato et al. | |
| 2025/0133223 | A1 * | 4/2025 | Gaikov | H04N 19/147 |

FOREIGN PATENT DOCUMENTS

| | | |
|---|---|---|
| WO | 2020189709 A1 | 9/2020 |
| WO | 2022084702 A1 | 4/2022 |

OTHER PUBLICATIONS

International Search Report for PCT/US2023/070433, mailed on Oct. 24, 2023, 3 pages.

* cited by examiner

*Primary Examiner* — Matthew K Kwan

(74) *Attorney, Agent, or Firm* — Astute IP Law Group

(57) ABSTRACT

Embodiments of the present disclosure provide a solution for visual data processing. A method for visual data processing is proposed. The method comprises: determining, for a conversion between at least one bitstream of visual data and the visual data, a residual representation of the visual data at least based on a first probability distribution parameter of the visual data and a gain parameter, the residual representation representing a residual value compared to a second probability distribution representation of the visual data, the gain parameter adjusting a value range of the residual representation; and performing the conversion based on the residual representation.

19 Claims, 9 Drawing Sheets

$$\min_{g_a, g_s, q} D(z, \hat{z}) + \lambda R(q(y))$$

| Component | Symbol |
|---|---|
| Input Image | $x$ |
| Encoder | $f(x; \theta_e)$ |
| Latents | $y$ |
| Latents (quantized) | $\hat{y}$ |
| Decoder | $g(\hat{y}; \theta_d)$ |
| Hyper Encoder | $f_h(y; \theta_{he})$ |
| Hyper-latents | $z$ |
| Hyper-latents (quant.) | $\hat{z}$ |
| Hyper Decoder | $g_h(\hat{z}; \theta_{hd})$ |
| Context Model | $g_{cm}(y_{<i}; \theta_{cm})$ |
| Entropy Parameters | $g_{ep}(\cdot; \theta_{ep})$ |
| Reconstruction | $\hat{x}$ |

500

METHOD, APPARATUS, AND MEDIUM FOR VISUAL DATA PROCESSING

CROSS REFERENCE TO RELATED APPLICATIONS

This application is a continuation of International Application No. PCT/US2023/070433, filed on Jul. 18, 2023, which claims priority to U.S. Provisional Application No. 63/369,219 filed Jul. 22, 2022. The entire contents of these applications are hereby incorporated by reference in their entireties.

FIELDS

Embodiments of the present disclosure relates generally to visual data processing techniques, and more particularly, to rate adjustment for visual data processing.

BACKGROUND

Image/video compression is an essential technique to reduce the costs of image/video transmission and storage in a lossless or lossy manner. Image/video compression techniques can be divided into two branches, the classical video coding methods and the neural-network-based video compression methods. Classical video coding schemes adopt transform-based solutions, in which researchers have exploited statistical dependency in the latent variables (e.g., wavelet coefficients) by carefully hand-engineering entropy codes modeling the dependencies in the quantized regime. Neural network-based video compression is in two flavors, neural network-based coding tools and end-to-end neural network-based video compression. The former is embedded into existing classical video codecs as coding tools and only serves as part of the framework, while the latter is a separate framework developed based on neural networks without depending on classical video codecs. Coding efficiency of image/video coding is generally expected to be further improved.

SUMMARY

Embodiments of the present disclosure provide a solution for visual data processing.

In a first aspect, a method for visual data processing is proposed. The method comprises: determining, for a conversion between at least one bitstream of visual data and the visual data, a residual representation of the visual data at least based on a first probability distribution parameter of the visual data and a gain parameter, the residual representation representing a residual value compared to a second probability distribution representation of the visual data, the gain parameter adjusting a value range of the residual representation; and performing the conversion based on the residual representation.

The method in accordance with the first aspect of the present disclosure adjusts the output rate of the conversion by using the gain parameter. For example, the rate of the bitstream or the rate of the visual data can be adjusted. In this way, coding efficiency and coding effectiveness can be improved.

In a second aspect, an apparatus for visual data processing is proposed. The apparatus comprises a processor and a non-transitory memory with instructions thereon. The instructions upon execution by the processor, cause the processor to perform a method in accordance with the first aspect of the present disclosure.

In a third aspect, a non-transitory computer-readable storage medium is proposed. The non-transitory computer-readable storage medium stores instructions that cause a processor to perform a method in accordance with the first aspect of the present disclosure.

In a fourth aspect, another non-transitory computer-readable recording medium is proposed. The non-transitory computer-readable recording medium stores at least one bitstream of visual data which is generated by a method performed by an apparatus for visual data processing. The method comprises: determining a residual representation of the visual data at least based on a first probability distribution parameter of the visual data and a gain parameter, the residual representation representing a residual value compared to a second probability distribution representation of the visual data, the gain parameter adjusting a value range of the residual representation; and generating the at least one bitstream based on the residual representation.

In a fifth aspect, a method for storing at least one bitstream of visual data is proposed. The method comprises: determining a residual representation of the visual data at least based on a first probability distribution parameter of the visual data and a gain parameter, the residual representation representing a residual value compared to a second probability distribution representation of the visual data, the gain parameter adjusting a value range of the residual representation; generating the at least one bitstream based on the residual representation; and storing the at least one bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
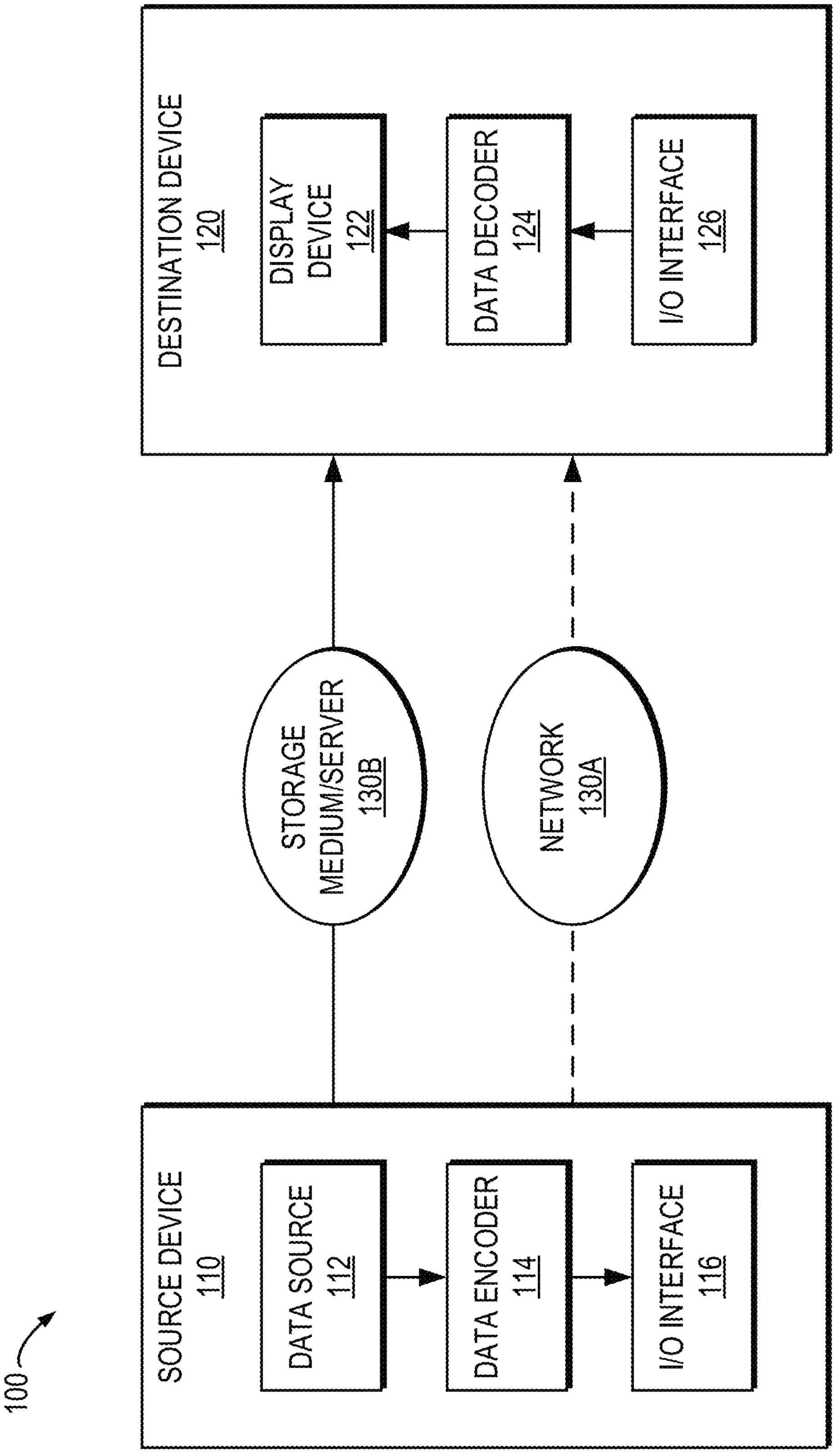
FIG. 1 illustrates a block diagram that illustrates an example visual data coding system, in accordance with some embodiments of the present disclosure.

FIG. 1 is a block diagram that illustrates an example visual data coding system 100 that may utilize the techniques of this disclosure. As shown, the visual data coding system 100 may include a source device 110 and a destination device 120. The source device 110 can be also referred to as a data encoding device or a visual data encoding device, and the destination device 120 can be also referred to as a data decoding device or a visual data decoding device. In operation, the source device 110 can be configured to generate encoded visual data and the destination device 120 can be configured to decode the encoded visual data generated by the source device 110. The source device 110 may include a data source 112, a data encoder 114, and an input/output (I/O) interface 116.

The data source 112 may include a source such as a data capture device. Examples of the data capture device include, but are not limited to, an interface to receive data from a data provider, a computer graphics system for generating data, and/or a combination thereof.

The data may comprise one or more pictures of a video or one or more images. The data encoder 114 encodes the data from the data source 112 to generate a bitstream. The bitstream may include a sequence of bits that form a coded representation of the data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded data may be transmitted directly to destination device 120 via the I/O interface 116 through the network 130A. The encoded data may also be stored onto a storage medium/server 130B for access by destination device 120.

The destination device 120 may include an I/O interface 126, a data decoder 124, and a display device 122. The I/O interface 126 may include a receiver and/or a modem. The I/O interface 126 may acquire encoded data from the source device 110 or the storage medium/server 130B. The data decoder 124 may decode the encoded data. The display device 122 may display the decoded data to a user. The display device 122 may be integrated with the destination device 120, or may be external to the destination device 120 which is configured to interface with an external display device.

The data encoder 114 and the data decoder 124 may operate according to a data coding standard, such as video coding standard or still picture coding standard and other current and/or further standards.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific data codecs, the disclosed techniques are applicable to other coding technologies also. Furthermore, while some embodiments describe coding steps in detail, it will be understood that corresponding steps decoding that undo the coding will be implemented by a decoder. Furthermore, the term data processing encompasses data coding or compression, data decoding or decompression and data transcoding in which data are represented from one compressed format into another compressed format or at a different compressed bitrate.

More details of the embodiments of the present disclosure will be described below which are related to rate adjustment for visual data processing. As used herein, the term "data" or "visual data" may refer to an image, a frame in a video, a picture in a video, a video, or any other data suitable to be coded.

1. BRIEF SUMMARY

A neural network-based image and video compression method comprising an auto-regressive subnetwork, an entropy coding engine, wherein entropy coding is performed independently of the auto-regressive subnetwork. Gained Variational Autoencoder (G-VAE) is used for continuously rate adaptation.

2. INTRODUCTION

The past decade has witnessed the rapid development of deep learning in a variety of areas, especially in computer vision and image processing. Inspired from the great success of deep learning technology to computer vision areas, many researchers have shifted their attention from conventional image/video compression techniques to neural image/video compression technologies. Neural network was invented originally with the interdisciplinary research of neuroscience and mathematics. It has shown strong capabilities in the context of non-linear transform and classification. Neural network-based image/video compression technology has gained significant progress during the past half decade. It is reported that the latest neural network-based image compression algorithm achieves comparable R-D performance with Versatile Video Coding (VVC), the latest video coding standard developed by Joint Video Experts Team (JVET) with experts from MPEG and VCEG. With the performance of neural image compression continually being improved, neural network-based video compression has become an actively developing research area. However, neural network-based video coding still remains in its infancy due to the inherent difficulty of the problem.

2.1 Image/Video Compression

Image/video compression usually refers to the computing technology that compresses image/video into binary code to facilitate storage and transmission. The binary codes may or may not support lossless reconstructing the original image/video, termed lossless compression and lossy compression. Most of the efforts are devoted to lossy compression since lossless reconstruction is not necessary in most scenarios. Usually the performance of image/video compression algorithms is evaluated from two aspects, i.e. compression ratio and reconstruction quality. Compression ratio is directly related to the number of binary codes, the less the better; Reconstruction quality is measured by comparing the reconstructed image/video with the original image/video, the higher the better. Image/video compression techniques can be divided into two branches, the classical video coding methods and the neural-network-based video compression methods. Classical video coding schemes adopt transform-based solutions, in which researchers have exploited statistical dependency in the latent variables (e.g., DCT or wavelet coefficients) by carefully hand-engineering entropy codes modeling the dependencies in the quantized regime. Neural network-based video compression is in two flavors, neural network-based coding tools and end-to-end neural network-based video compression. The former is embedded into existing classical video codecs as coding tools and only serves as part of the framework, while the latter is a separate framework developed based on neural networks without depending on classical video codecs.

In the last three decades, a series of classical video coding standards have been developed to accommodate the increasing visual content. The international standardization organizations ISO/IEC has two expert groups namely Joint Photographic Experts Group (JPEG) and Moving Picture Experts Group (MPEG), and ITU-T also has its own Video Coding Experts Group (VCEG) which is for standardization of image/video coding technology. The influential video coding standards published by these organizations include JPEG, JPEG 2000, H.262, H.264/AVC and H.265/HEVC. After H.265/HEVC, the Joint Video Experts Team (JVET) formed by MPEG and VCEG has been working on a new video coding standard Versatile Video Coding (VVC). The first version of VVC was released in July 2020. An average of 50% bitrate reduction is reported by VVC under the same visual quality compared with HEVC.

Neural network-based image/video compression is not a new solution since there were a number of researchers working on neural network-based image coding. But the network architectures were relatively shallow, and the performance was not satisfactory. Benefit from the abundance of data and the support of powerful computing resources, neural network-based methods are better exploited in a variety of applications. At present, neural network-based image/video compression has shown promising improvements, confirmed its feasibility. Nevertheless, this technology is still far from mature, and a lot of challenges need to be addressed.

2.2 Neural Networks

Neural networks, also known as artificial neural networks (ANN), are the computational models used in machine learning technology which are usually composed of multiple processing layers and each layer is composed of multiple simple but non-linear basic computational units. One benefit of such deep networks is believed to be the capacity for processing data with multiple levels of abstraction and converting data into different kinds of representations. Note that these representations are not manually designed; instead, the deep network including the processing layers is learned from massive data using a general machine learning procedure. Deep learning eliminates the necessity of handcrafted representations, and thus is regarded useful especially for processing natively unstructured data, such as acoustic and visual signal, whilst processing such data has been a longstanding difficulty in the artificial intelligence field.

2.3 Neural Networks for Image Compression

Existing neural networks for image compression methods can be classified in two categories, i.e., pixel probability modeling and auto-encoder. The former one belongs to the predictive coding strategy, while the latter one is the transform-based solution. Sometimes, these two methods are combined together in literature.

2.3.1 Pixel Probability Modeling

According to Shannon's information theory, the optimal method for lossless coding can reach the minimal coding rate—$\log_2 p(x)$ where $p(x)$ is the probability of symbol x. A number of lossless coding methods were developed in literature and among them arithmetic coding is believed to be among the optimal ones. Given a probability distribution $p(x)$, arithmetic coding ensures that the coding rate to be as close as possible to its theoretical limit—$\log_2 p(x)$ without considering the rounding error. Therefore, the remaining problem is to how to determine the probability, which is however very challenging for natural image/video due to the curse of dimensionality. Following the predictive coding strategy, one way to model $p(x)$ is to predict pixel probabilities one by one in a raster scan order based on previous observations, where x is an image.

$$p(x) = p(x_1)p(x_2 \mid x_1) \ \ldots \ p(x_i \mid x_1, \ \ldots \ , x_{i-1}) \ \ldots \ p(x_{m\times n} \mid x_1, \ \ldots \ , x_{m\times n-1}) \quad (1)$$

where m and n are the height and width of the image, respectively. The previous observation is also known as the context of the current pixel. When the image is large, it can be difficult to estimate the conditional probability, thereby a simplified method is to limit the range of its context.

$$p(x) = p(x_1)p(x_2 \mid x_1) \ \ldots \ p(x_i \mid x_{i-k}, \ \ldots \ , x_{i-1}) \ \ldots \ p(x_{m\times n} \mid x_{m\times n-k}, \ \ldots \ , x_{m\times n-1}) \quad (2)$$

where k is a pre-defined constant controlling the range of the context.

It should be noted that the condition may also take the sample values of other color components into consideration. For example, when coding the RGB color component, R sample is dependent on previously coded pixels (including RIG/B samples), the current G sample may be coded according to previously coded pixels and the current R sample, while for coding the current B sample, the previously coded pixels and the current R and G samples may also be taken into consideration.

Neural networks were originally introduced for computer vision tasks and have been proven to be effective in regression and classification problems. Therefore, it has been proposed using neural networks to estimate the probability of $p(x_i)$ given its context $x_1, x_2, \ldots, x_{i-1}$. The pixel probability is proposed for binary images, i.e., $x_i \in \{-1, +1\}$. The neural autoregressive distribution estimator (NADE) is designed for pixel probability modeling, where is a feed-forward network with a single hidden layer. A similar work is presented, where the feed-forward network also has connections skipping the hidden layer, and the parameters are also shared. Experiments are performed on the binarized MNIST dataset. NADE is extended to a real-valued model RNADE, where the probability $p(x_i|x_1, \ldots, x_{i-1})$ is derived with a mixture of Gaussians. Their feed-forward network also has a single hidden layer, but the hidden layer is with rescaling to avoid saturation and uses rectified linear unit (ReLU) instead of sigmoid. NADE and RNADE are improved by using reorganizing the order of the pixels and with deeper neural networks. Designing advanced neural networks plays an important role in improving pixel probability modeling. Multi-dimensional long short-term memory (LSTM) is proposed, which is working together with mixtures of conditional Gaussian scale mixtures for probability modeling. LSTM is a special kind of recurrent neural networks (RNNs) and is proven to be good at modeling sequential data. The spatial variant of LSTM is used for images later. Several different neural networks are studied, including RNNs and CNNs namely PixelRNN and PixelCNN, respectively. In PixelRNN, two variants of LSTM, called row LSTM and diagonal BiLSTM are proposed, where the latter is specifically designed for images. PixelRNN incorporates residual connections to help train deep neural networks with up to 12 layers. In PixelCNN, masked convolutions are used to suit for the shape of the context. Comparing with previous works, PixelRNN and PixelCNN are more dedicated to natural images: they consider pixels as discrete values (e.g., 0, 1, . . . , 255) and predict a multinomial distribution over the discrete values; they deal with color images in RGB color space; they work well on large-scale image dataset ImageNet. Gated PixelCNN is proposed to improve the PixelCNN, and achieves comparable performance with PixelRNN but with much less complexity. PixelCNN++ is proposed with the following improvements upon PixelCNN: a discretized logistic mixture likelihood is used rather than a 256-way multinomial distribution; down-sampling is used to capture structures at multiple resolutions; additional short-cut connections are introduced to speed up training; dropout is adopted for regularization; RGB is combined for one pixel. PixelSNAIL is proposed, in which casual convolutions are combined with self-attention. Most of the above methods directly model the probability distribution in the pixel domain. Some researchers also attempt to model the probability distribution as a conditional one upon explicit or latent representations. That being said, we may estimate $$p(x \mid h) = \prod_{i=1}^{m\times n} p(x_i \mid x_1, \ \ldots \ , x_{i-1}, h) \quad (3)$$

where h is the additional condition and p(x)=p(h)p(x|h), meaning the modeling is split into an unconditional one and a conditional one. The additional condition can be image label information or high-level representations.

2.3.2 Auto-Encoder

Auto-encoder originates from the well-known work is proposed. The method is trained for dimensionality reduction and consists of two parts: encoding and decoding. The encoding part converts the high-dimension input signal to low-dimension representations, typically with reduced spatial size but a greater number of channels. The decoding part attempts to recover the high-dimension input from the low-dimension representation. Auto-encoder enables automated learning of representations and eliminates the need of hand-crafted features, which is also believed to be one of the most important advantages of neural networks.

Figure 2:
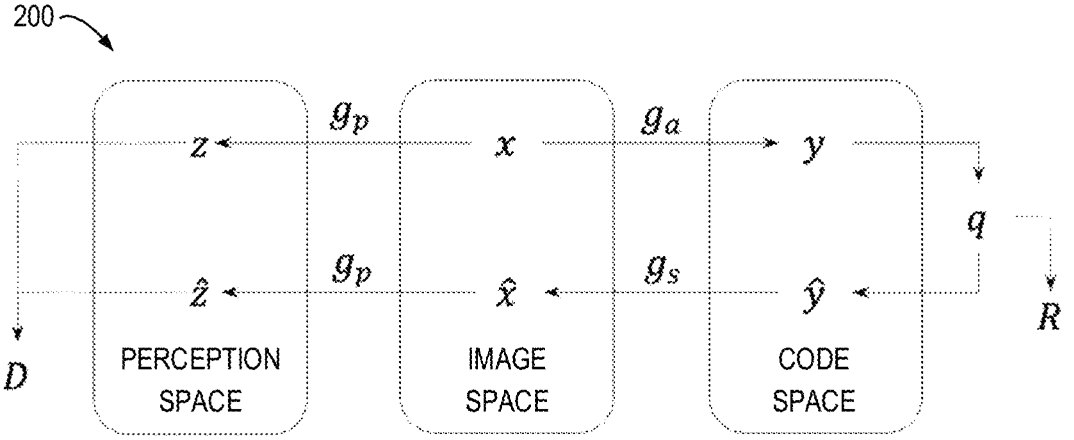
FIG. 2 illustrates a typical transform coding scheme.

FIG. 2 illustrates a typical transform coding scheme 200. The original image x is transformed by the analysis network $g_a$ to achieve the latent representation y. The latent representation y is quantized and compressed into bits. The number of bits R is used to measure the coding rate. The quantized latent representation $\hat{y}$ is then inversely transformed by a synthesis network $g_s$ to obtain the reconstructed image $\hat{x}$. The distortion is calculated in a perceptual space by transforming x and $\hat{x}$ with the function $g_p$.

It is intuitive to apply auto-encoder network to lossy image compression. We only need to encode the learned latent representation from the well-trained neural networks. However, it is not trivial to adapt auto-encoder to image compression since the original auto-encoder is not optimized for compression thereby not efficient by directly using a trained auto-encoder. In addition, there exist other major challenges: First, the low-dimension representation should be quantized before being encoded, but the quantization is not differentiable, which is required in backpropagation while training the neural networks. Second, the objective under compression scenario is different since both the distortion and the rate need to be taken into consideration. Estimating the rate is challenging. Third, a practical image coding scheme needs to support variable rate, scalability, encoding/decoding speed, interoperability. In response to these challenges, a number of researchers have been actively contributing to this area.

The prototype auto-encoder for image compression is in FIG. 2, which can be regarded as a transform coding strategy. The original image x is transformed with the analysis network $y=g_a(x)$, where y is the latent representation which will be quantized and coded. The synthesis network will inversely transform the quantized latent representation $\hat{y}$ back to obtain the reconstructed image $\hat{x}=g_s(\hat{y})$. The framework is trained with the rate-distortion loss function, i.e., $\mathcal{L}=D+\lambda R$, where D is the distortion between x and $\hat{x}$, R is the rate calculated or estimated from the quantized representation $\hat{y}$, and $\lambda$ is the Lagrange multiplier. It should be noted that D can be calculated in either pixel domain or perceptual domain. All existing research works follow this prototype and the difference might only be the network structure or loss function.

In terms of network structure, RNNs and CNNs are the most widely used architectures. In the RNNs relevant category, a general framework for variable rate image compression using RNN is proposed. They use binary quantization to generate codes and do not consider rate during training. The framework indeed provides a scalable coding functionality, where RNN with convolutional and deconvolution layers is reported to perform decently. It is proposed an improved version by upgrading the encoder with a neural network similar to PixelRNN to compress the binary codes. The performance is reportedly better than JPEG on Kodak image dataset using MS-SSIM evaluation metric. The RNN-based solution is further improved by introducing hidden-state priming. In addition, an SSIM-weighted loss function is also designed, and spatially adaptive bitrates mechanism is enabled. They achieve better results than BPG on Kodak image dataset using MS-SSIM as evaluation metric. Spatially adaptive bitrates are supported by training stop-code tolerant RNNs.

A general framework for rate-distortion optimized image compression is proposed. The use multiary quantization to generate integer codes and consider the rate during training, i.e. the loss is the joint rate-distortion cost, which can be MSE or others. They add random uniform noise to stimulate the quantization during training and use the differential entropy of the noisy codes as a proxy for the rate. They use generalized divisive normalization (GDN) as the network structure, which consists of a linear mapping followed by a nonlinear parametric normalization. The effectiveness of GDN on image coding is verified. An improved version is then proposed, where they use 3 convolutional layers each followed by a down-sampling layer and a GDN layer as the forward transform. Accordingly, they use 3 layers of inverse GDN each followed by an up-sampling layer and convolution layer to stimulate the inverse transform. In addition, an arithmetic coding method is devised to compress the integer codes. The performance is reportedly better than JPEG and JPEG 2000 on Kodak dataset in terms of MSE. Furthermore, the method is improved by devising a scale hyper-prior into the auto-encoder. They transform the latent representation y with a subnet $h_a$ to $z=h_a(y)$ and z will be quantized and transmitted as side information. Accordingly, the inverse transform is implemented with a subnet $h_s$ attempting to decode from the quantized side information $\hat{z}$ to the standard deviation of the quantized $\hat{y}$, which will be further used during the arithmetic coding of $\hat{y}$. On the Kodak image set, their method is slightly worse than BPG in terms of PSNR. The structures in the residue space are further exploited by introducing an autoregressive model to estimate both the standard deviation and the mean. In the latest work, Gaussian mixture model is used to further remove redundancy in the residue. The reported performance is on par with VVC on the Kodak image set using PSNR as evaluation metric.

2.3.3 Hyper Prior Model

In the transform coding approach to image compression, the encoder subnetwork (section 2.3.2) transforms the image vector x using a parametric analysis transform $g_a(x, \emptyset_g)$ into a latent representation y, which is then quantized to form $\hat{y}$. Because $\hat{y}$ is discrete-valued, it can be lossless compressed using entropy coding techniques such as arithmetic coding and transmitted as a sequence of bits.

Figure 3:
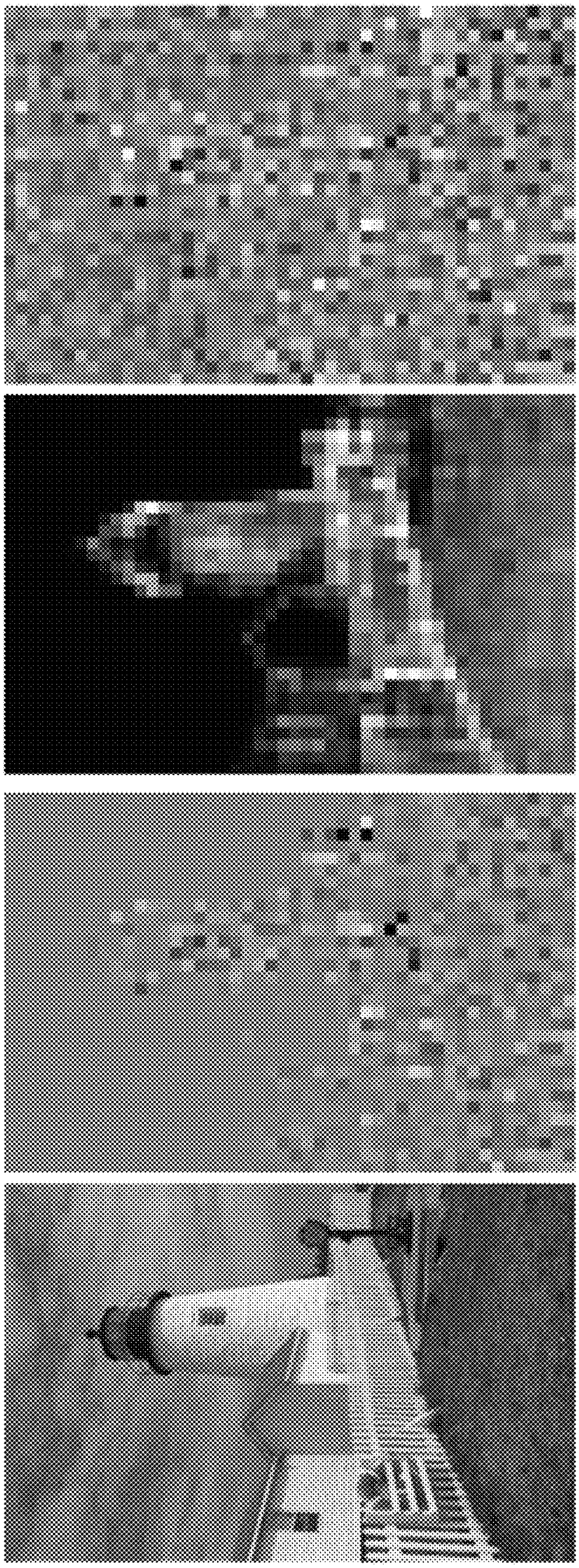
FIG. 3 illustrates an image from the Kodak dataset and different representations of the image.

FIG. 3 illustrates an image from the Kodak dataset and different representations of the image, where the left shows an image from the Kodak dataset, the middle left shows a visualization of the latent representation y of that image, the middle right shows standard deviations a of the latent, and the right shows latents y after the hyper prior (hyper encoder and decoder) network is introduced.

Figure 4:
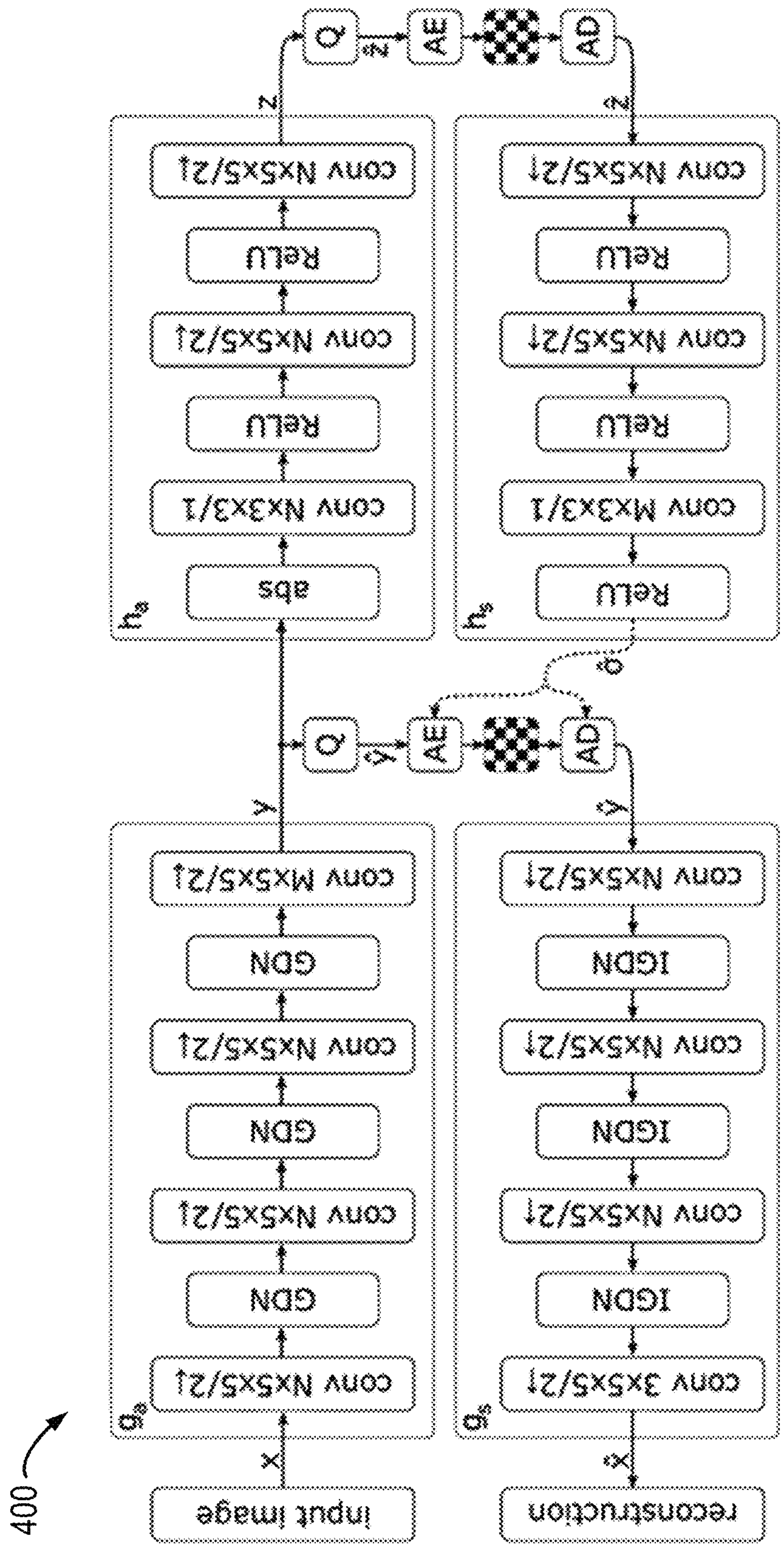
FIG. 4 illustrates a network architecture of an autoencoder implementing the hyperprior model.

As evident from the middle left and middle right image of FIG. 3, there are significant spatial dependencies among the elements of $\hat{y}$. Notably, their scales (middle right image) appear to be coupled spatially. An additional set of random variables $\hat{z}$ are introduced to capture the spatial dependencies and to further reduce the redundancies. In this case the image compression network is depicted in FIG. 4. FIG. 4 illustrates a network architecture 400 of an autoencoder implementing the hyperprior model.

In FIG. 4, the left hand of the models is the encoder $g_a$ and decoder $g_s$ (explained in section 2.3.2). The right-hand side is the additional hyper encoder $h_a$ and hyper decoder $h_s$ networks that are used to obtain $\hat{z}$. In this architecture the encoder subjects the input image x to $g_a$, yielding the responses y with spatially varying standard deviations. The responses y are fed into $h_a$, summarizing the distribution of standard deviations in z. z is then quantized ($\hat{z}$), compressed, and transmitted as side information. The encoder then uses the quantized vector $\hat{z}$ to estimate $\sigma$, the spatial distribution of standard deviations, and uses it to compress and transmit the quantized image representation $\hat{y}$. The decoder first recovers $\hat{z}$ from the compressed signal. It then uses $h_s$ to obtain $\sigma$, which provides it with the correct probability estimates to successfully recover $\hat{y}$ as well. It then feeds $\hat{y}$ into $g_s$ to obtain the reconstructed image.

When the hyper encoder and hyper decoder are added to the image compression network, the spatial redundancies of the quantized latent $\hat{y}$ are reduced. The rightmost image in FIG. 3 correspond to the quantized latent when hyper encoder/decoder are used. Compared to middle right image, the spatial redundancies are significantly reduced, as the samples of the quantized latent are less correlated.

FIG. 4 illustrates a network architecture 400 of an autoencoder implementing the hyperprior model. The left side shows an image autoencoder network, the right side corresponds to the hyperprior subnetwork. The analysis and synthesis transforms are denoted as $g_a$ and $g_a$. Q represents quantization, and AE, AD represent arithmetic encoder and arithmetic decoder, respectively. The hyperprior model consists of two subnetworks, hyper encoder (denoted with $h_a$) and hyper decoder (denoted with $h_s$). The hyper prior model generates a quantized hyper latent ($\hat{z}$) which comprises information about the probability distribution of the samples of the quantized latent $\hat{y}$. $\hat{z}$ is included in the bitstream and transmitted to the receiver (decoder) along with $\hat{y}$.

2.3.4 Context Model

Although the hyper prior model improves the modelling of the probability distribution of the quantized latent $\hat{y}$, additional improvement can be obtained by utilizing an autoregressive model that predicts quantized latents from their causal context (Context Model).

The term auto-regressive means that the output of a process is later used as input to it. For example, the context model subnetwork generates one sample of a latent, which is later used as input to obtain the next sample.

Figure 5:
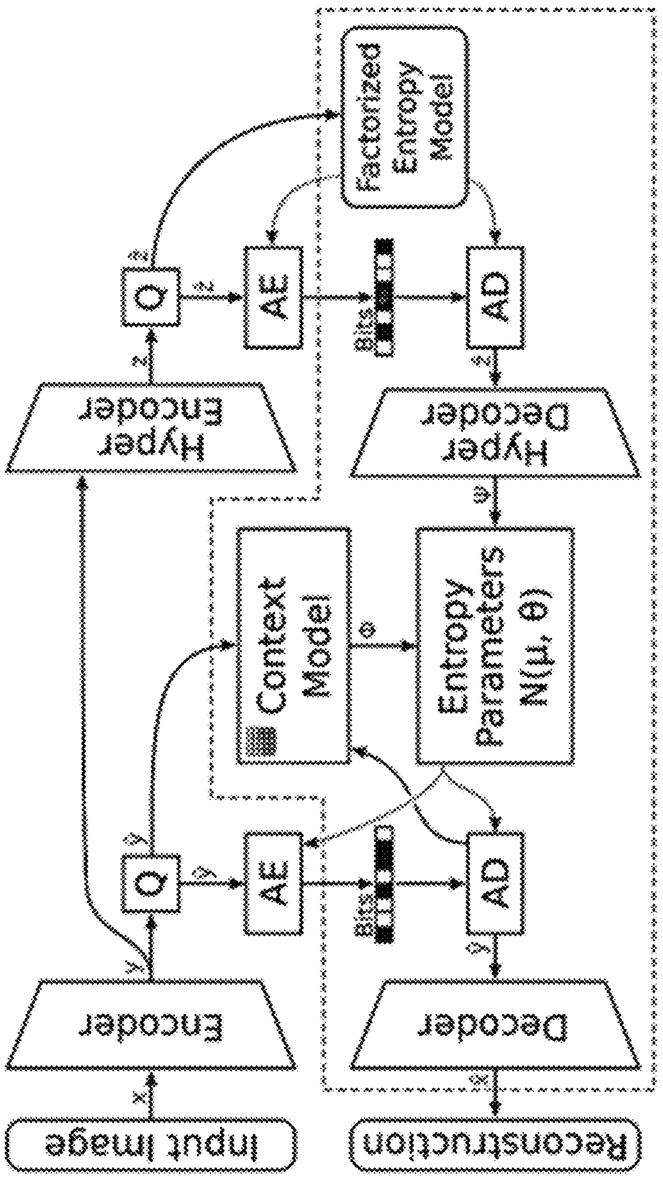
FIG. 5 illustrates a block diagram of a combined model.

Joint Autoregressive and Hierarchical Priors for Learned Image Compression utilizes a joint architecture where both hyper prior model subnetwork (hyper encoder and hyper decoder) and a context model subnetwork are utilized. The hyper prior and the context model are combined to learn a probabilistic model over quantized latents ŷ, which is then used for entropy coding. As depicted in FIG. 5, the outputs of context subnetwork and hyper decoder subnetwork are combined by the subnetwork called Entropy Parameters, which generates the mean μ and scale (or variance) σ parameters for a Gaussian probability model. The gaussian probability model is then used to encode the samples of the quantized latents into bitstream with the help of the arithmetic encoder (AE) module. In the decoder the gaussian probability model is utilized to obtain the quantized latents ŷ from the bitstream by arithmetic decoder (AD) module. FIG. 5 illustrates a block diagram 500 of a combined model. The combined model jointly optimizes an autoregressive component that estimates the probability distributions of latents from their causal context (Context Model) along with a hyperprior and the underlying autoencoder. Real-valued latent representations are quantized (Q) to create quantized latents (ŷ) and quantized hyper-latents (ẑ), which are compressed into a bitstream using an arithmetic encoder (AE) and decompressed by an arithmetic decoder (AD). The highlighted region corresponds to the components that are executed by the receiver (i.e., a decoder) to recover an image from a compressed bitstream. Typically, the latent samples are modeled as gaussian distribution or gaussian mixture models (not limited to). In joint autoregressive and hierarchical priors for learned image compression and according to FIG. 5, the context model and hyper prior are jointly used to estimate the probability distribution of the latent samples. Since a gaussian distribution can be defined by a mean and a variance (aka sigma or scale), the joint model is used to estimate the mean and variance (denoted as μ and σ).

2.3.5 Gained Variational Autoencoders (G-VAE)

Typically, neural network-based image/video compression methodologies need to train multiple models to adapt to different rates. Gained variational autoencoders (G-VAE) is the variational autoencoder with a pair of gain units, which is designed to achieve continuously variable rate adaptation using a single model. It comprises of a pair of gain units, which are typically inserted to the output of encoder and input of decoder. The output of the encoder is defined as the latent representation $y \in R^{c*h*w}$, where c, h, w represent the number of channels, the height and width of the latent representation. Each channel of the latent representation is denoted as $y_{(j)} \in R^{h*w}$, where i=0, 1, . . . , c−1. A pair of gain units include a gain matrix $M \in R^{c*n}$ and an inverse gain matrix, where n is the number of gain vectors. The gain vector can be denoted as $m_s=\{\alpha_{s(0)}, \alpha_{s(1)}, \ldots, \alpha_{s(c-1)}\}$, $\alpha_{s(i)} \in R$ where s denotes the index of the gain vectors in the gain matrix.

The motivation of gain matrix is similar to the quantization table in JPEG by controlling the quantization loss based on the characteristics of different channels. To apply the gain matrix to the latent representation, each channel is multiplied with the corresponding value in a gain vector.

$$\overline{y}_s = y \odot m_s$$

Where ⊙ is channel-wise multiplication, i.e., $\overline{y}_{s(i)}=y_{(i)}\times\alpha_{s(i)}$, and $\alpha_{s(i)}$ is the i-th gain value in the gain vector $m_s$. The inverse gain matrix used at the decoder side can be denoted as $M' \in R^{c*n}$, which consists of n inverse gain vectors, i.e., $M'=\{\delta_{s(0)}, \delta_{s(1)}, \ldots, \delta_{s(c-1)}\}$, $\delta_{s(i)} \in R$. The inverse gain process is expressed as $$y'_s = \hat{y} \odot m'_s$$

where ŷ is the decoded quantized latent representation and $$y'_s$$

is the inversely gained quantized latent representation, which will be fed into the synthesis network.

To achieve continuous variable rate adjustment, interpolation is used between vectors. Given two pairs of gain vectors $$\{m_t, m'_t\} \text{ and } \{m_r, m'_r\},$$

the interpolated gain vector can be obtained via the following equations.

$$m_v = \left[(m_r)^l \cdot (m_t)^{1-l}\right]$$

$$m'_v = \left[(m'_r)^l \cdot (m'_t)^{1-l}\right]$$

where $l \in R$ is an interpolation coefficient, which controls the corresponding bit rate of the generated gain vector pair. Since l is a real number, an arbitrary bit rate between the given two gain vector pairs can be achieved.

2.3.6 the Encoding Process Using Joint Auto-Regressive Hyper Prior Model

The FIG. 5. corresponds to the state of art compression method that is proposed in joint autoregressive and hierarchical priors for learned image compression. In this section and the next, the encoding and decoding processes will be described separately.

Figure 6:
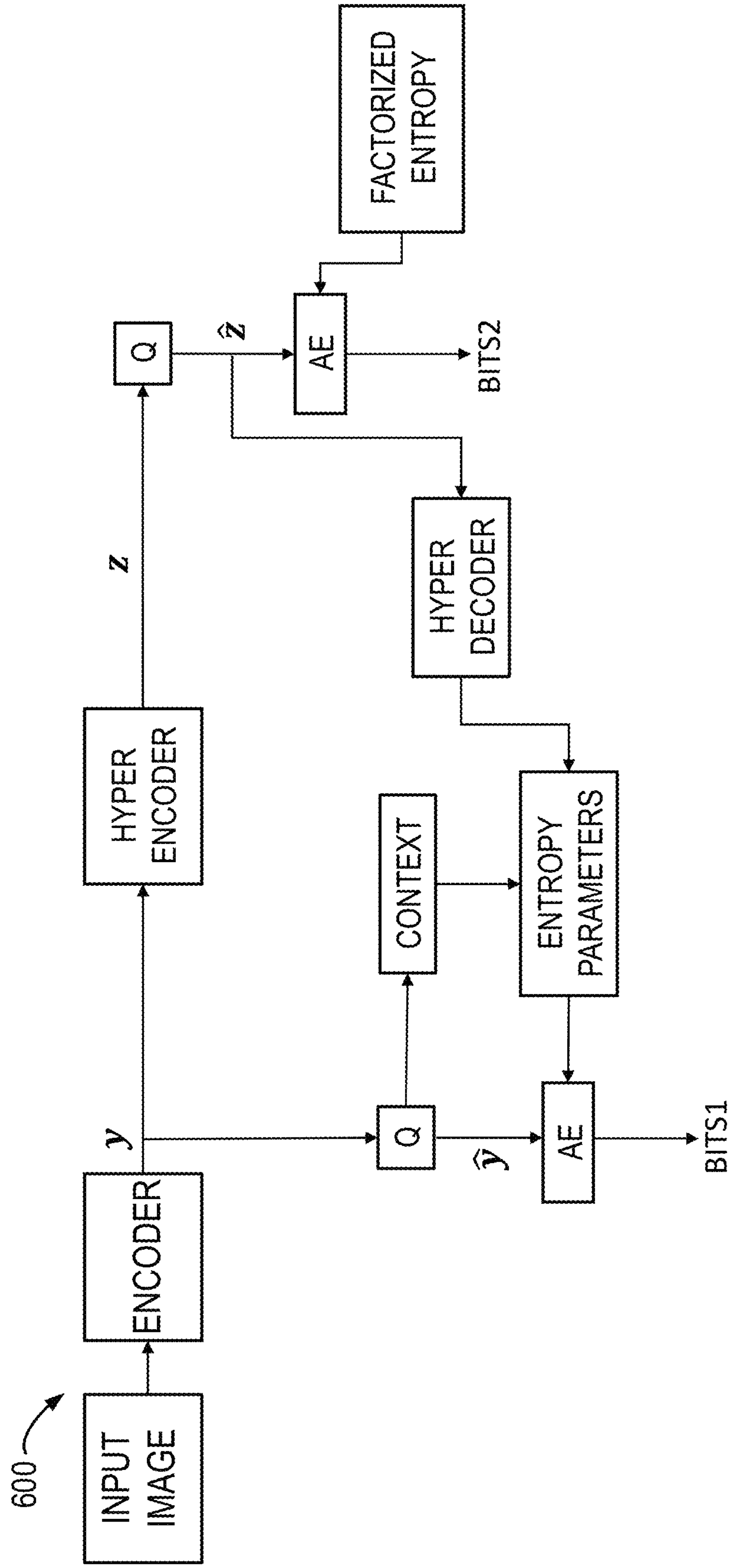
FIG. 6 illustrates an encoding process according to joint autoregressive and hierarchical priors for learned image compression.

FIG. 6 depicts the encoding process 600 according to joint autoregressive and hierarchical priors for learned image compression. The input image is first processed with an encoder subnetwork. The encoder transforms the input image into a transformed representation called latent, denoted by y. y is then input to a quantizer block, denoted by Q, to obtain the quantized latent (ŷ). ŷ is then converted to a bitstream (bits1) using an arithmetic encoding module (denoted AE). The arithmetic encoding block converts each sample of the ŷ into a bitstream (bits1) one by one, in a sequential order.

The modules hyper encoder, context, hyper decoder, and entropy parameters subnetworks are used to estimate the probability distributions of the samples of the quantized latent ŷ. the latent y is input to hyper encoder, which outputs the hyper latent (denoted by z). The hyper latent is then quantized (ẑ) and a second bitstream (bits2) is generated using arithmetic encoding (AE) module. The factorized entropy module generates the probability distribution, that is used to encode the quantized hyper latent into bitstream. The quantized hyper latent includes information about the probability distribution of the quantized latent (ŷ).

The Entropy Parameters subnetwork generates the probability distribution estimations, that are used to encode the quantized latent ŷ. The information that is generated by the Entropy Parameters typically include a mean μ and scale (or variance) σ parameters, that are together used to obtain a gaussian probability distribution. A gaussian distribution of a random variable x is defined as $$f(x) = \frac{1}{\sigma\sqrt{2\pi}} e^{-\frac{1}{2}\left(\frac{x-\mu}{\sigma}\right)^2}$$

wherein the parameter μ is the mean or expectation of the distribution (and also its median and mode), while the parameter σ is its standard deviation (or variance, or scale). In order to define a gaussian distribution, the mean and the variance need to be determined. In joint autoregressive and hierarchical priors for learned image compression, the entropy parameters module are used to estimate the mean and the variance values.

The subnetwork hyper decoder generates part of the information that is used by the entropy parameters subnetwork, the other part of the information is generated by the autoregressive module called context module. The context module generates information about the probability distribution of a sample of the quantized latent, using the samples that are already encoded by the arithmetic encoding (AE) module. The quantized latent ŷ is typically a matrix composed of many samples. The samples can be indicated using indices, such as ŷ[i, j, k] or ŷ[i,j] depending on the dimensions of the matrix ŷ. The samples ŷ[i,j] are encoded by AE one by one, typically using a raster scan order. In a raster scan order the rows of a matrix are processed from top to bottom, wherein the samples in a row are processed from left to right. In such a scenario (wherein the raster scan order is used by the AE to encode the samples into bitstream), the context module generates the information pertaining to a sample ŷ[i,j], using the samples encoded before, in raster scan order. The information generated by the context module and the hyper decoder are combined by the entropy parameters module to generate the probability distributions that are used to encode the quantized latent ŷ into bitstream (bits1).

Finally, the first and the second bitstream are transmitted to the decoder as result of the encoding process.

It is noted that the other names can be used for the modules described above.

In the above description, the all of the elements in FIG. 6 are collectively called encoder. The analysis transform that converts the input image into latent representation is also called an encoder (or auto-encoder).

2.3.7 the Decoding Process Using Joint Auto-Regressive Hyper Prior Model

Figure 7:
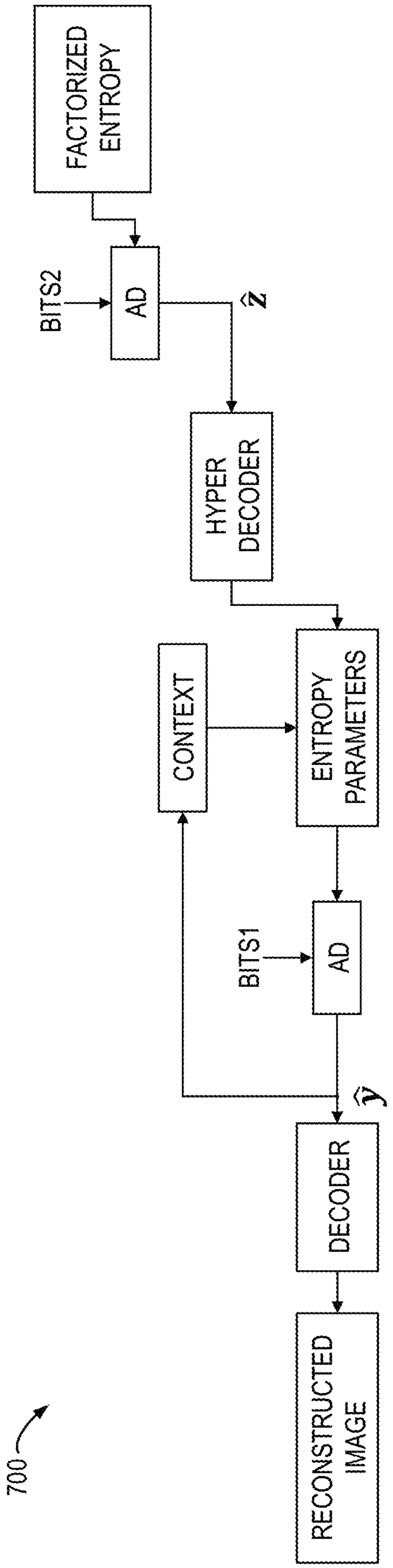
FIG. 7 illustrates a decoding process separately corresponding to joint autoregressive and hierarchical priors for learned image compression.

FIG. 7 depicts the decoding process 700 separately corresponding to joint autoregressive and hierarchical priors for learned image compression.

In the decoding process, the decoder first receives the first bitstream (bits1) and the second bitstream (bits2) that are generated by a corresponding encoder. The bits2 is first decoded by the arithmetic decoding (AD) module by utilizing the probability distributions generated by the factorized entropy subnetwork. The factorized entropy module typically generates the probability distributions using a predetermined template, for example using predetermined mean and variance values in the case of gaussian distribution. The output of the arithmetic decoding process of the bits2 is ẑ, which is the quantized hyper latent. The AD process reverts to AE process that was applied in the encoder. The processes of AE and AD are lossless, meaning that the quantized hyper latent 2 that was generated by the encoder can be reconstructed at the decoder without any change.

After obtaining of ẑ, it is processed by the hyper decoder, whose output is fed to entropy parameters module. The three subnetworks, context, hyper decoder and entropy parameters that are employed in the decoder are identical to the ones in the encoder. Therefore, the exact same probability distributions can be obtained in the decoder (as in encoder), which is essential for reconstructing the quantized latent ŷ without any loss. As a result, the identical version of the quantized latent ŷ that was obtained in the encoder can be obtained in the decoder.

After the probability distributions (e.g., the mean and variance parameters) are obtained by the entropy parameters subnetwork, the arithmetic decoding module decodes the samples of the quantized latent one by one from the bitstream bits1. From a practical standpoint, autoregressive model (the context model) is inherently serial, and therefore cannot be sped up using techniques such as parallelization.

Finally, the fully reconstructed quantized latent ŷ is input to the synthesis transform (denoted as decoder in FIG. 7) module to obtain the reconstructed image.

In the above description, the all of the elements in FIG. 7 are collectively called decoder. The synthesis transform that converts the quantized latent into reconstructed image is also called a decoder (or auto-decoder).

2.4 Neural Networks for Video Compression

Similar to conventional video coding technologies, neural image compression serves as the foundation of intra compression in neural network-based video compression, thus development of neural network-based video compression technology comes later than neural network-based image compression but needs far more efforts to solve the challenges due to its complexity. Starting from 2017, a few researchers have been working on neural network-based video compression schemes. Compared with image compression, video compression needs efficient methods to remove inter-picture redundancy. Inter-picture prediction is then a crucial step in these works. Motion estimation and compensation is widely adopted but is not implemented by trained neural networks until recently.

Studies on neural network-based video compression can be divided into two categories according to the targeted scenarios: random access and the low-latency. In random access case, it requires the decoding can be started from any point of the sequence, typically divides the entire sequence into multiple individual segments and each segment can be decoded independently. In low-latency case, it aims at reducing decoding time thereby usually merely temporally previous frames can be used as reference frames to decode subsequent frames.

2.4.1 Low-Latency

A video compression scheme with trained neural networks is proposed. They first split the video sequence frames into blocks and each block will choose one from two available modes, either intra coding or inter coding. If intra coding is selected, there is an associated auto-encoder to compress the block. If inter coding is selected, motion estimation and compensation are performed with tradition methods and a trained neural network will be used for residue compression. The outputs of auto-encoders are directly quantized and coded by the Huffman method.

Another neural network-based video coding scheme with PixelMotionCNN is proposed. The frames are compressed in the temporal order, and each frame is split into blocks which are compressed in the raster scan order. Each frame will firstly be extrapolated with the preceding two reconstructed frames. When a block is to be compressed, the extrapolated frame along with the context of the current block are fed into the PixelMotionCNN to derive a latent representation. Then the residues are compressed by the variable rate image scheme. This scheme performs on par with H.264.

The real-sense end-to-end neural network-based video compression framework such as an end-to-end deep video compression framework DVC is proposed, in which all the modules are implemented with neural networks. The scheme accepts current frame and the prior reconstructed frame as inputs and optical flow will be derived with a pretrained neural network as the motion information. The motion information will be warped with the reference frame followed by a neural network generating the motion compensated frame. The residues and the motion information are compressed with two separate neural auto-encoders. The whole framework is trained with a single rate-distortion loss function. It achieves better performance than H.264.

An advanced neural network-based video compression scheme is proposed. It inherits and extends traditional video coding schemes with neural networks with the following major features: 1) using only one auto-encoder to compress motion information and residues; 2) motion compensation with multiple frames and multiple optical flows; 3) an on-line state is learned and propagated through the following frames over time. This scheme achieves better performance in MS-SSIM than HEVC reference software.

An extended end-to-end neural network-based video compression framework based on an end-to-end deep video compression framework DVC is proposed. In this solution, multiple frames are used as references. It is thereby able to provide more accurate prediction of current frame by using multiple reference frames and associated motion information. In addition, motion field prediction is deployed to remove motion redundancy along temporal channel. Post-processing networks are also introduced in this work to remove reconstruction artifacts from previous processes. The performance is better than DVC and H.265 by a noticeable margin in terms of both PSNR and MS-SSIM.

Scale-space flow is proposed to replace commonly used optical flow by adding a scale parameter based on framework of DVC. It is reportedly achieving better performance than H.264.

A multi-resolution representation for optical flows based on DVC is proposed. Concretely, the motion estimation network produces multiple optical flows with different resolutions and let the network to learn which one to choose under the loss function. The performance is slightly improved compared with DVC and better than H.265.

2.4.2 Random Access

A neural network-based video compression scheme with frame interpolation is proposed. The key frames are first compressed with a neural image compressor and the remaining frames are compressed in a hierarchical order. They perform motion compensation in the perceptual domain, i.e., deriving the feature maps at multiple spatial scales of the original frame and using motion to warp the feature maps, which will be used for the image compressor. The method is reportedly on par with H.264.

A method for interpolation-based video compression is proposed, wherein the interpolation model combines motion information compression and image synthesis, and the same auto-encoder is used for image and residual.

A neural network-based video compression method based on variational auto-encoders with a deterministic encoder is proposed. Concretely, the model consists of an auto-encoder and an auto-regressive prior. Different from previous methods, this method accepts a group of pictures (GOP) as inputs and incorporates a 3D autoregressive prior by taking into account of the temporal correlation while coding the laten representations. It provides comparative performance as H.265.

2.5 Preliminaries

Almost all the natural image/video is in digital format. A grayscale digital image can be represented by $x \in \mathbb{D}^{m \times n}$, where $\mathbb{D}$ is the set of values of a pixel, m is the image height and n is the image width. For example, $\mathbb{D}=\{0, 1, 2, \ldots, 255\}$ is a common setting and in this case $|\mathbb{D}|=256=2^8$, thus the pixel can be represented by an 8-bit integer. An uncompressed grayscale digital image has 8 bits-per-pixel (bpp), while compressed bits are definitely less.

A color image is typically represented in multiple channels to record the color information. For example, in the RGB color space an image can be denoted by $x \in \mathbb{D}^{m \times n \times 3}$ with three separate channels storing Red, Green and Blue information. Similar to the 8-bit grayscale image, an uncompressed 8-bit RGB image has 24 bpp. Digital images/videos can be represented in different color spaces. The neural network-based video compression schemes are mostly developed in RGB color space while the traditional codecs typically use YUV color space to represent the video sequences. In YUV color space, an image is decomposed into three channels, namely Y, Cb and Cr, where Y is the luminance component and Cb/Cr are the chroma components. The benefits come from that Cb and Cr are typically down sampled to achieve pre-compression since human vision system is less sensitive to chroma components.

A color video sequence is composed of multiple color images, called frames, to record scenes at different timestamps. For example, in the RGB color space, a color video can be denoted by $X=\{x_0, x_1, \ldots, x_t, \ldots, x_{T-1}\}$ where T is the number of frames in this video sequence, $x \in \mathbb{D}^{m \times n}$. If m=1080, n=1920, $|\mathbb{D}|=2^8$, and the video has 50 frames-per-second (fps), then the data rate of this uncompressed video is 1920×1080×8×3×50=2,488,320,000 bits-per-second (bps), about 2.32 Gbps, which needs a lot storage thereby definitely needs to be compressed before transmission over the internet.

Usually, the lossless methods can achieve compression ratio of about 1.5 to 3 for natural images, which is clearly below requirement. Therefore, lossy compression is developed to achieve further compression ratio, but at the cost of incurred distortion. The distortion can be measured by calculating the average squared difference between the original image and the reconstructed image, i.e., mean-squared-error (MSE). For a grayscale image, MSE can be calculated with the following equation.

$$MSE = \frac{\|x - \hat{x}\|^2}{m \times n} \tag{4}$$

Accordingly, the quality of the reconstructed image compared with the original image can be measured by peak signal-to-noise ratio (PSNR):

$$PSNR = 10 \times \log_{10} \frac{(\max(\mathbb{D}))^2}{MSE} \quad (5)$$

where $\max(\mathbb{D})$ is the maximal value in $\mathbb{D}$, e.g., 255 for 8-bit grayscale images. There are other quality evaluation metrics such as structural similarity (SSIM) and multi-scale SSIM (MS-SSIM).

To compare different lossless compression schemes, it is sufficient to compare either the compression ratio given the resulting rate or vice versa. However, to compare different lossy compression methods, it has to take into account both the rate and reconstructed quality. For example, to calculate the relative rates at several different quality levels, and then to average the rates, is a commonly adopted method; the average relative rate is known as Bjontegaard's delta-rate (BD-rate). There are other important aspects to evaluate image/video coding schemes, including encoding/decoding complexity, scalability, robustness, and so on.

3. PROBLEMS

3.1 the Core Problem

Problem 1. The commonly used way to achieve different rates in neural network-based image/video compression is to train multiple models with separate Lagrange multipliers, which is neither time efficient nor storage efficient. In addition, only discretized rate points can be achieved using multiple fixed rate pretrained models.

Problem 2. The state-of-the-art works usually process multiple components in a single network, i.e., RGB or YUV, which may harm the performance since these components show different characteristics.

4. DETAILED SOLUTIONS

The detailed embodiments below should be considered as examples to explain general concepts. These embodiments should not be interpreted in a narrow way. Furthermore, these embodiments can be combined in any manner. Separate networks are used to process luma and chroma components. The benefits are twofold: 1) Luma and chroma have different characteristics such that using separate networks can better capture its unique patterns and improve the coding performance. 2) Chroma component contains less information than luma component, thus using a simpler network could reduce the decoding complexity.

4.1 Target of the Disclosure

The target of the disclosure is to provide a continuously variable rate neural network-based image/video compression methodology using one or several model(s).

4.2 Core of the Disclosure

4.2.1 Decoding Process

Figure 8:
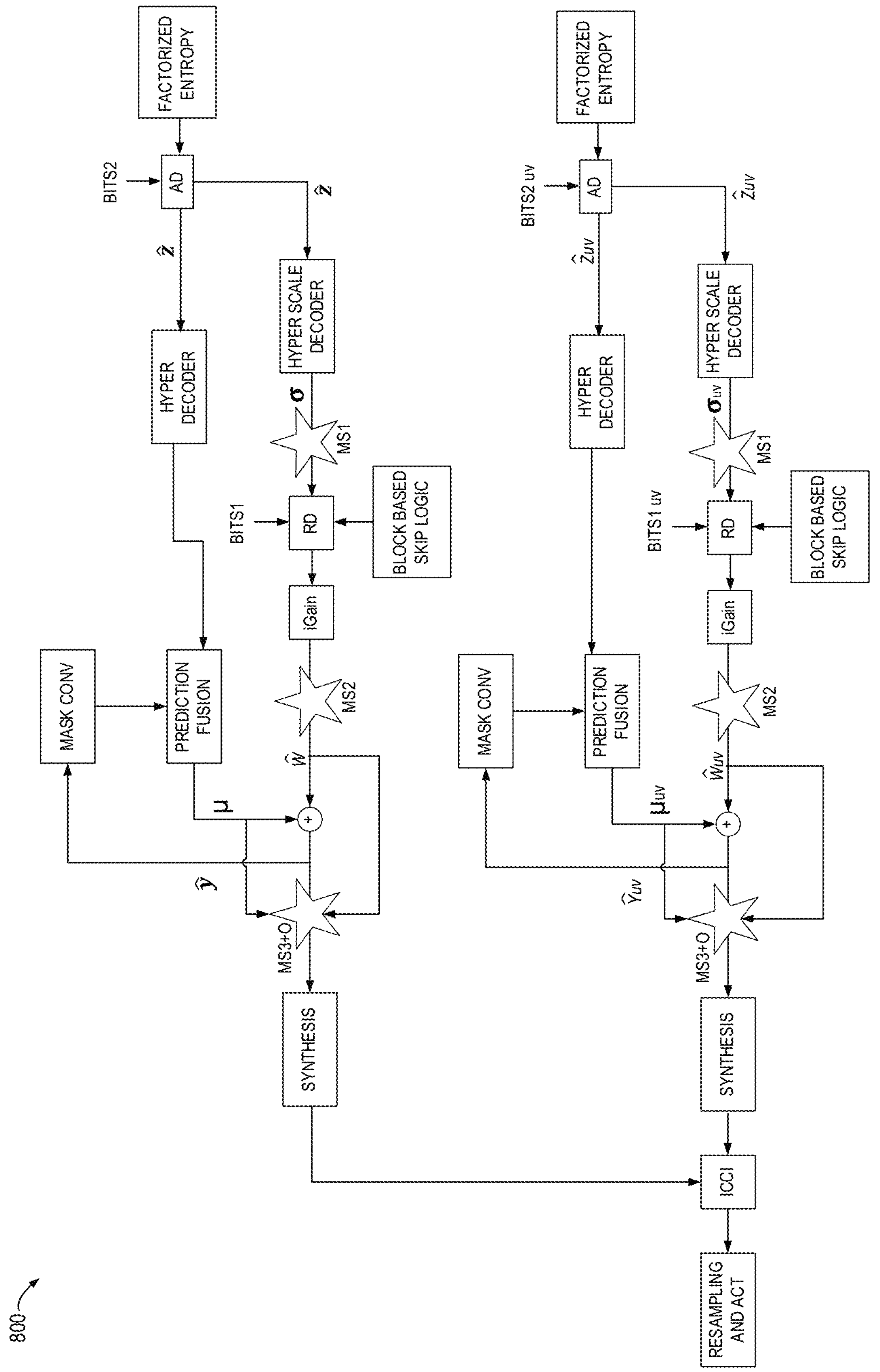
FIG. 8 illustrates the decoding process in accordance with embodiments of the present disclosure.

FIG. 8 illustrates the decoding process 800 in accordance with embodiments of the present disclosure.

According to the embodiments, the decoding operation is performed as follows:

1. Firstly, the factorized entropy model is used to decode the quantized latents for luma and chroma, i.e., $\hat{z}$ and $\hat{z}_{uv}$ in FIG. 8.
2. The probability parameters (e.g. variance) generated by the second network are used to generate a quantized residual latent by performing the arithmetic decoding process.
3. The quantized residual latent is inversely gained with the inverse gain unit (iGain) as shown in FIG. 8. The outputs of the inverse gain units are denoted as $\hat{w}$ and $\hat{w}_{uv}$ for luma and chroma components, respectively.
4. For the luma component, the following steps are performed in a loop until all elements of $\hat{y}$ are obtained:
   a. A first subnetwork is used to estimate a mean value parameter of a quantized latent ($\hat{y}$), using the already obtained samples of $\hat{y}$.
   b. The quantized residual latent $\hat{w}$ and the mean value are used to obtain the next element of $\hat{y}$.
5. After all of the samples of $\hat{y}$ are obtained, a synthesis transform can be applied to obtain the reconstructed image.
6. For chroma component, steps 4 and 5 are the same but with a separate set of networks.
7. The decoded luma component is used as additional information to obtain the chroma component. Specifically, the Inter Channel Correlation Information filter sub-network (ICCI) is used for chroma component restoration. The luma is fed into the ICCI sub-network as additional information to assist the chroma component decoding.
8. Adaptive color transform (ACT) is performed after the luma and chroma components are reconstructed.

The module named ICCI is a neural-network based post-processing module. The embodiments are not limited to the ICCI subnetwork, any other neural network based postprocessing module might also be used.

An exemplary implementation of embodiments is depicted in the FIG. 8 above (the decoding process). The framework comprises two branches for luma and chroma components respectively. In each of the branch, the first subnetwork comprises the context, prediction and optionally the hyper decoder modules. The second network comprises the hyper scale decoder module. The quantized hyper latent are $\hat{z}$ and $\hat{z}_{uv}$. The arithmetic decoding process generates the quantized residual latents, which are further fed into the iGain units to obtain the gained quantized residual latents $\hat{w}$ and $\hat{w}_{uv}$.

After the residual latent is obtained, a recursive prediction operation is performed to obtain the latent $\hat{y}$ and $\hat{y}_{uv}$. The following steps describe how to obtain the samples of latent $\hat{y}$[:, i, j], and the chroma component is processed in the same way but with different networks.

1. An autoregressive context module is used to generate first input of a prediction module using the samples $\hat{y}$[:, m, n] where the (m, n) pair are the indices of the samples of the latent that are already obtained.
2. Optionally the second input of the prediction module is obtained by using a hyper decoder and a quantized hyper latent $\hat{z}_1$.
3. Using the first input and the second input, the prediction module generates the mean value mean[:, i,j].
4. The mean value mean[:, i,j] and the quantized residual latent $\hat{w}$[:, i, j] are added together to obtain the latent $\hat{y}$[:, i,j].
5. The steps 1-4 are repeated for the next sample.

Whether to and/or how to apply at least one method disclosed in the document may be signaled from the encoder to the decoder, e.g., in the bitstream.

Alternatively, whether to and/or how to apply at least one method disclosed in the document may be determined by the decoder based on coding information, such as dimensions, color format, etc.

Alternative or additionally, the modules named MS1, MS2 or MS3+O (in FIG. 8), might be included in the processing flow. The said modules might perform an operation to their input by multiplying the input with a scalar or adding an adding an additive component to the input to obtain the output. The scalar or the additive component that are used by the said modules might be indicated in a bitstream.

The module named RD or the module named AD in the FIG. 8 might be an entropy decoding module. It might be a range decoder or an arithmetic decoder or the like.

The embodiments described herein is not limited to the specific combination of the units exemplified in FIG. 8. Some of the modules might be missing and some of the modules might be displaced in processing order. Also additional modules might be included. For example:

1. The ICCI module might be removed. In that case the output of the Synthesis module and the Synthesis UV module might be combined by means of another module, that might be based on neural networks.
2. One or more of the modules named MS1, MS2 or MS3+O might be removed. The core of the disclosure is not affected by the removing of one or more of the said scaling and adding modules.

4.3 The Difference Between the State of the Art and the Disclosure

There are 3 major differences between the state of the art and the embodiments according to the present disclosure.

1. The embodiments include both the gain units and the decoupled architecture, i.e., the arithmetic encoding and decoding is performed independently of the autoregressive subnetwork. The embodiments thus can provide better parallelization with continuously rate adaptation.
2. The luma and chroma components are processed with two separate networks.
3. A postprocessing filter (e.g., ICCI) is used for chroma resampling with the assistance of luma component.

4.4 Benefit of the Embodiments

The benefit of the embodiments is as follows:

1. Continuous rate can be achieved with a single pretrained model.
2. Dedicated networks for luma and chroma components can capture their unique characteristics more efficiently, thus improve compression performance.

4.5 Examples

The detailed embodiments below should be considered as examples to explain general concepts. These embodiments should not be interpreted in a narrow way. Furthermore, these embodiments can be combined in any manner.

1. In one example, the decoder comprises two branches, one for luma and the other for chroma components. The luma component is used to help reconstruction of the chroma components.
2. In one example, the decoder comprises both the decoupled architecture and the gain units for better penalization and continuous rate adaptation, respectively.
3. In one example, the chroma component is resampled using the ICCI filter.

5. EMBODIMENTS

1. Decoder:

An image or video decoding method, comprising the steps of:

Obtaining a sample of a quantized residual latent $\hat{w}$ using a bitstream and the output of a first subnetwork with inverse gain units (iGain), wherein the first subnetwork is not autoregressive.

Obtaining a prediction value mean using a second subnetwork and already reconstructed samples of a quantized latent $\hat{y}$.

Reconstructing the next sample of the quantized latent $\hat{y}$ using the quantized residual sample $\hat{w}$ and the prediction mean.

Obtaining the reconstructed image using the quantized latent $\hat{y}$ and a synthesis transform.

As discussed above, the commonly used way to achieve different rates in neural network-based image/video compression is to train multiple models with separate Lagrange multipliers, which is neither time efficient nor storage efficient. In addition, only discretized rate points can be achieved using multiple fixed rate pretrained models.

To solve the above problems and some other problems not mentioned, visual data processing solutions as described below are disclosed. The embodiments of the present disclosure should be considered as examples to explain the general concepts and should not be interpreted in a narrow way. Furthermore, these embodiments can be applied individually or combined in any manner.

Figure 9:
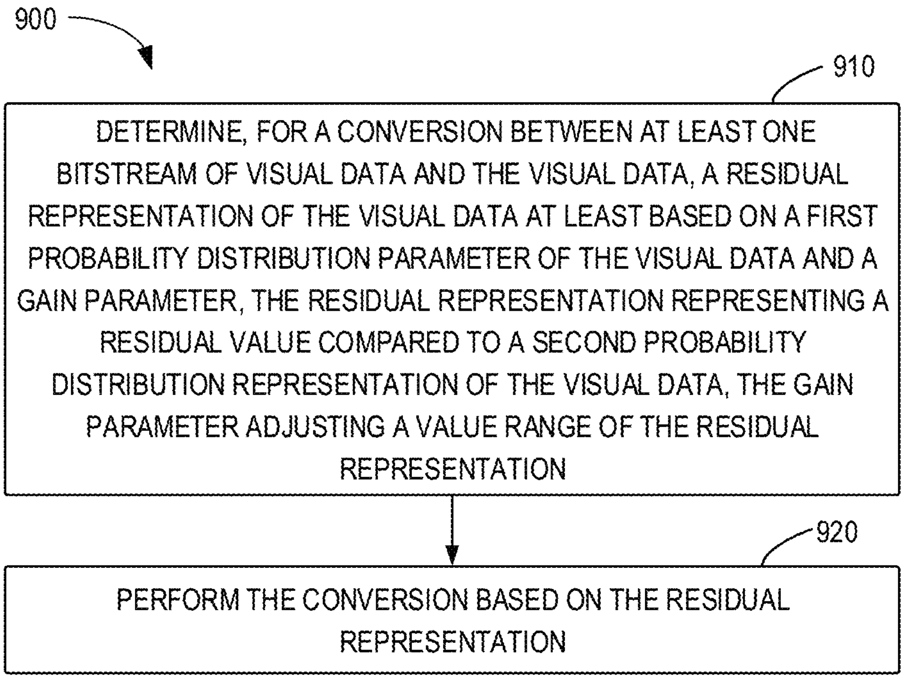
FIG. 9 illustrates a flowchart of a method for visual data processing in accordance with embodiments of the present disclosure.

FIG. 9 illustrates a flowchart of a method 900 for visual data processing in accordance with embodiments of the present disclosure. The method 900 is implemented for a conversion between visual data and at least one bitstream of the visual data.

At block 910, a residual representation of the visual data is determined at least based on a first probability distribution parameter of the visual data (such as a variance of the visual data) and a gain parameter. The residual representation represents a residual value compared to a second probability distribution representation of the visual data such as a mean of the visual data. The gain parameter adjusts a value range of the residual representation.

At block 920, the conversion is performed based on the residual representation. In some embodiments, the conversion includes encoding the visual data into the at least one bitstream. Alternatively, or in addition, in some embodiments, the conversion includes decoding the visual data from the at least one bitstream.

The method 900 enables a continuously variable rate of output of the model based visual data processing. For example, the rate of the at least one bitstream or the rate of the visual data can be adjusted to a continuously variable rate. Thus, coding efficiency and coding effectiveness can be improved.

In some embodiments, the at least one bitstream comprises a first bitstream such as bitstream 1 (also referred as bits1) and a second bitstream such as bitstream 2 (also referred to as bits2). The first bitstream comprises arithmetic information of the visual data, and the second bitstream comprises probability distribution information of the visual data.

In some embodiments, the conversion comprises decoding the visual data from the first and second bitstreams. In the decoding conversion, the gain parameter comprises a first gain parameter. The first probability distribution parameter of the visual data may be determined based on the second bitstream and a model such as a hyper scale decoder. The residual representation of the visual data may be determined based on the first bitstream, the first probability distribution parameter and the first gain parameter. The visual data may be determined at least based on the residual representation of the visual data. For example, the probability parameters (e.g., variance) generated by the second network are used to generate a quantized residual latent by performing the arithmetic decoding process. The quantized residual latent is inversely gained with the inverse gain unit (iGain) as shown in FIG. 8. The outputs of the inverse gain units are denoted as $\hat{w}$ and $\hat{w}_{uv}$ for luma and chroma components, respectively. After all of the samples of $\hat{y}$ are obtained, a synthesis transform can be applied to obtain the reconstructed image.

In some embodiments, obtaining the residual representation of the visual data comprises: determining a first intermediate representation of the residual representation based on the first bitstream, the first probability distribution parameter and a first entropy model; and determining the residual representation by multiplying the first gain parameter to the first intermediate representation.

In some embodiments, the first intermediate representation comprises a plurality of components associated with a plurality of channels of the first entropy model. The first gain parameter comprises a plurality of gain components. The number of the plurality of gain components is the same with the number of the plurality of channels. The first entropy model may be a range decoder or an arithmetic decoder.

In some embodiments, determining the visual data comprises: determining the second probability distribution representation of the visual data based on a first sample of the visual data and a prediction module; determining a second sample of the visual data based on the second probability distribution representation of the visual data and the residual representation; and reconstructing the visual data based on the first and second samples and a synthesis model. For example, a first subnetwork is used to estimate a mean value parameter of a quantized latent ($\hat{y}$), using the already obtained samples of $\hat{y}$. The quantized residual latent $\hat{w}$ and the mean value are used to obtain the next element of $\hat{y}$. After all of the samples of $\hat{y}$ are obtained, a synthesis transform can be applied to obtain the reconstructed image.

In some embodiments, determining the second probability distribution representation comprises: determining context information of the visual data based on the first sample and a context module; determining hyper information of the visual data at least based on the second bitstream and a second entropy model; and determining the second probability distribution representation based on the context information, the hyper information and the prediction module. In some embodiments, the hyper information is further determined based on a hyper coder. The second entropy model may be a range decoder or an arithmetic decoder.

In an example, an autoregressive context module is used to generate first input of a prediction module using the samples $\hat{y}[:, m, n]$ where the (m, n) pair are the indices of the samples of the latent that are already obtained. Optionally the second input of the prediction module is obtained by using a hyper decoder and a quantized hyper latent $\hat{z_1}$. Using the first input and the second input, the prediction module generates the mean value mean[:, i,j].

In some embodiments, determining the first probability distribution parameter of the visual data comprises: determining a variance value of the visual data based on the second bitstream and the model; and determining the first probability distribution parameter based on the variance value and a first predefined value, the first predefined value being added or multiplied to the variance value. For example, the first predefined value may be implemented by the module MS1 shown in FIG. 8.

In some embodiments, obtaining the residual representation comprises: determining a second intermediate representation of the visual data based on the first bitstream, the first probability distribution parameter, the first gain parameter; and determining the residual representation based on the second intermediate representation and a second predefined value, the second predefined value being added or multiplied to the second intermediate representation. For example, the second predefined value may be implemented by the module MS2 shown in FIG. 8.

In some embodiments, the model comprises a hyper scale coder, the hyper scale coder being not autoregressive.

In some embodiments, the residual representation of the visual data comprises a luma residual representation and a chroma residual representation.

In some embodiments, the visual data comprises a luma component and a chroma component. The visual data may be determined by determining the luma component at least based on the luma residual representation; and determining the chroma component at least based on the chroma residual representation. That is, the decoder may comprise two branches, one for luma and the other for chroma components.

For example, the framework shown in FIG. 8 comprises two branches for luma and chroma components respectively. In each of the branch, the first subnetwork comprises the context, prediction and optionally the hyper decoder modules. The second network comprises the hyper scale decoder module. The quantized hyper latent are $\hat{z}$ and $\hat{z}_{uv}$. The arithmetic decoding process generates the quantized residual latents, which are further fed into the iGain units to obtain the gained quantized residual latents $\hat{w}$ and $\hat{w}_{uv}$. After the residual latent is obtained, a recursive prediction operation is performed to obtain the latent $\hat{y}$ and $\hat{y}_{uv}$.

In some embodiments, determining the chroma component comprises: determining the chroma component based on the chroma residual representation and the luma component. That is, the luma component may be used to help reconstruction of the chroma components. The decoded luma component may be used as additional information to obtain the chroma component.

In some embodiments, a neural network based postprocessing module is applied to the luma component, and the chroma component is determined based on the postprocessed luma component. In some embodiments, the neural network based postprocessing module comprises an inter channel correlation information (ICCI) coding tool. For example, the chroma component may be resampled using the ICCI filter. Specifically, the ICCI may be used for chroma component restoration. The luma is fed into the ICCI sub-network as additional information to assist the chroma component decoding.

In some embodiments, the luma residual representation is determined based on a first luma probability distribution parameter and the first gain parameter.

In some embodiments, the first luma probability distribution parameter is determined based on a first hyper scale coder.

In some embodiments, the luma component is determined based on the luma residual representation, a first context model and a first prediction module. In some embodiments, the luma component is further based on a first hyper coder.

In some embodiments, the chroma residual representation is determined based on a first chroma probability distribution parameter and the first gain parameter.

In some embodiments, the first chroma probability distribution parameter is determined based on a second hyper scale coder.

In some embodiments, the chroma component is determined based on the chroma residual representation, a second context model and a second prediction module. In some embodiments, the chroma component is further based on a second hyper coder.

In some embodiments, the method 900 further comprises: applying an adaptive color transform to the luma component and chroma component; and determining the visual data based on the applying. That is, adaptive color transform (ACT) is performed after the luma and chroma components are reconstructed.

In some embodiments, the method 900 further comprises: updating at least one of the luma component or the chroma component based on a third predefined value, the third predefined value being added or multiplied to the at least one of the luma component or the chroma component. For example, the third predefined value may be implemented by the module MS3+O shown in FIG. 8.

In some embodiments, the conversion comprises encoding the visual data into the first and second bitstreams, the gain parameter comprises a second gain parameter inverse to a first gain parameter associated with a decoding conversion. In the encoding conversion, the first and second bitstreams may be determined at least based on the second gain parameter and the residual representation.

Example embodiments implement the gain units and the decoupled architecture, i.e., the arithmetic encoding and decoding is performed independently of the autoregressive subnetwork. It thus can provide better parallelization with continuously rate adaptation.

In some embodiments, the residual representation comprises a quantized residual representation.

In some embodiments, the gain parameter comprises a plurality of gain vectors. For example, the gain parameter may be a gain matric or a gain unit. A gain vector in the plurality of gain vectors have a plurality of gain components. The visual data comprises a plurality of components associated with a plurality of channels. The number of the plurality of gain components may be the same with the number of the plurality of channels.

In some embodiments, a third gain vector is determined based on a convolution of a first gain vector and a second gain vector in the plurality of gain vectors.

In some embodiments, first information regarding applying the method is included in the bitstream. For example, whether to and/or how to apply at least one method disclosed in the document may be signaled from the encoder to the decoder, e.g. in the bitstream.

In some embodiments, the method 900 further comprises: determining first information regarding applying the method based on coding information. In some embodiments, the coding information comprises at least one of: a dimension of the visual data, or a color format of the visual data. For example, whether to and/or how to apply at least one method disclosed in the document may be determined by the decoder based on coding information, such as dimensions, color format, etc.

In some embodiments, the first information indicates at least one of: how to apply the method, or whether to apply the method.

According to further embodiments of the present disclosure, a non-transitory computer-readable recording medium is provided. The non-transitory computer-readable recording medium stores a bitstream of visual data which is generated by a method performed by an apparatus for visual data processing.

According to the method, a residual representation of the visual data is determined at least based on a first probability distribution parameter of the visual data and a gain parameter. The residual representation represents a residual value compared to a second probability distribution representation of the visual data. The gain parameter adjusts a value range of the residual representation. The at least one bitstream is generated based on the residual representation.

According to still further embodiments of the present disclosure, a method for storing bitstream of visual data is provided. In the method, a residual representation of the visual data is determined at least based on a first probability distribution parameter of the visual data and a gain parameter. The residual representation represents a residual value compared to a second probability distribution representation of the visual data. The gain parameter adjusts a value range of the residual representation. The at least one bitstream is generated based on the residual representation. The at least one bitstream is stored in a non-transitory computer-readable recording medium.

Implementations of the present disclosure can be described in view of the following clauses, the features of which can be combined in any reasonable manner. By using the implementations or embodiments of the present disclosure, continuous rate can be achieved with a single pre-trained model. In addition, dedicated networks for luma and chroma components can capture their unique characteristics more efficiently, thus improve compression performance.

Clause 1. A method for visual data processing, comprising: determining, for a conversion between at least one bitstream of visual data and the visual data, a residual representation of the visual data at least based on a first probability distribution parameter of the visual data and a gain parameter, the residual representation representing a residual value compared to a second probability distribution representation of the visual data, the gain parameter adjusting a value range of the residual representation; and performing the conversion based on the residual representation.

Clause 2. The method of clause 1, wherein the at least one bitstream comprises a first bitstream and a second bitstream, the first bitstream comprising arithmetic information of the visual data, the second bitstream comprising probability distribution information of the visual data.

Clause 3. The method of clause 2, wherein the conversion comprises decoding the visual data from the first and second bitstreams, the gain parameter comprises a first gain parameter, wherein determining the residual representation comprises: determining the first probability distribution parameter of the visual data based on the second bitstream and a model; and obtaining the residual representation of the visual data based on the first bitstream, the first probability distribution parameter and the first gain parameter; and wherein performing the conversion comprises: determining the visual data at least based on the residual representation of the visual data.

Clause 4. The method of clause 3, wherein obtaining the residual representation of the visual data comprises: determining a first intermediate representation of the residual representation based on the first bitstream, the first probability distribution parameter and a first entropy model; and determining the residual representation by multiplying the first gain parameter to the first intermediate representation.

Clause 5. The method of clause 4, wherein the first intermediate representation comprises a plurality of components associated with a plurality of channels of the first entropy model, and the first gain parameter comprises a plurality of gain components, the number of the plurality of gain components being the same with the number of the plurality of channels.

Clause 6. The method of clause any of clauses 3-5, wherein determining the visual data comprises: determining the second probability distribution representation of the visual data based on a first sample of the visual data and a prediction module; determining a second sample of the visual data based on the second probability distribution representation of the visual data and the residual representation; and reconstructing the visual data based on the first and second samples and a synthesis model.

Clause 7. The method of clause 6, wherein determining the second probability distribution representation comprises: determining context information of the visual data based on the first sample and a context module; determining hyper information of the visual data at least based on the second bitstream and a second entropy model; and determining the second probability distribution representation based on the context information, the hyper information and the prediction module.

Clause 8. The method of clause 7, wherein the hyper information is further determined based on a hyper coder.

Clause 9. The method of any of clauses 3-8, wherein determining the first probability distribution parameter of the visual data comprises: determining a variance value of the visual data based on the second bitstream and the model; and determining the first probability distribution parameter based on the variance value and a first predefined value, the first predefined value being added or multiplied to the variance value.

Clause 10. The method of any of clauses 3-9, wherein obtaining the residual representation comprises: determining a second intermediate representation of the visual data based on the first bitstream, the first probability distribution parameter, the first gain parameter; and determining the residual representation based on the second intermediate representation and a second predefined value, the second predefined value being added or multiplied to the second intermediate representation.

Clause 11. The method of any of clauses 3-10, wherein the model comprises a hyper scale coder, the hyper scale coder being not autoregressive.

Clause 12. The method of any of clauses 3-11, wherein the residual representation of the visual data comprises a luma residual representation and a chroma residual representation.

Clause 13. The method of clause 12, wherein the visual data comprises a luma component and a chroma component, and wherein determining the visual data at least based on the residual representation of the visual data comprises: determining the luma component at least based on the luma residual representation; and determining the chroma component at least based on the chroma residual representation.

Clause 14. The method of clause 13, wherein determining the chroma component comprises: determining the chroma component based on the chroma residual representation and the luma component.

Clause 15. The method of clause 14, wherein a neural network based postprocessing module is applied to the luma component, and the chroma component is determined based on the postprocessed luma component.

Clause 16. The method of clause 15, wherein the neural network based postprocessing module comprises an inter channel correlation information (ICCI) coding tool, the chroma component being resampled by the ICCI coding tool.

Clause 17. The method of any of clauses 12-16, wherein the luma residual representation is determined based on a first luma probability distribution parameter and the first gain parameter.

Clause 18. The method of clause 17, wherein the first luma probability distribution parameter is determined based on a first hyper scale coder.

Clause 19. The method of any of clauses 13-18, wherein the luma component is determined based on the luma residual representation, a first context model and a first prediction module.

Clause 20. The method of clause 19, wherein the luma component is further based on a first hyper coder.

Clause 21. The method of any of clauses 12-20, wherein the chroma residual representation is determined based on a first chroma probability distribution parameter and the first gain parameter.

Clause 22. The method of clause 21, wherein the first chroma probability distribution parameter is determined based on a second hyper scale coder.

Clause 23. The method of any of clauses 13-22, wherein the chroma component is determined based on the chroma residual representation, a second context model and a second prediction module.

Clause 24. The method of clause 23, wherein the chroma component is further based on a second hyper coder.

Clause 25. The method of any of clauses 13-24, further comprising: applying an adaptive color transform to the luma component and chroma component; and determining the visual data based on the applying.

Clause 26. The method of any of clauses 13-25, further comprising: updating at least one of the luma component or the chroma component based on a third predefined value, the third predefined value being added or multiplied to the at least one of the luma component or the chroma component.

Clause 27. The method of clause 2, wherein the conversion comprises encoding the visual data into the first and second bitstreams, the gain parameter comprises a second gain parameter inverse to a first gain parameter associated with a decoding conversion, and wherein performing the conversion comprises: determining the first and second bitstreams at least based on the second gain parameter and the residual representation.

Clause 28. The method of any of clauses 1-26, wherein the residual representation comprises a quantized residual representation.

Clause 29. The method of any of clauses 1-28, wherein the gain parameter comprises a plurality of gain vectors, a gain vector in the plurality of gain vectors having a plurality of gain components, the visual data comprising a plurality of components associated with a plurality of channels, the number of the plurality of gain components being the same with the number of the plurality of channels.

Clause 30. The method of clause 29, wherein a third gain vector is determined based on a convolution of a first gain vector and a second gain vector in the plurality of gain vectors.

Clause 31. The method of any of clauses 1-30, wherein first information regarding applying the method is included in the bitstream.

Clause 32. The method of any of clauses 1-30, further comprising: determining first information regarding applying the method based on coding information.

Clause 33. The method of clause 32, wherein the coding information comprises at least one of: a dimension of the visual data, or a color format of the visual data.

Clause 34. The method of any of clauses 31-33, wherein the first information indicates at least one of: how to apply the method, or whether to apply the method.

Clause 35. The method of any of clauses 1-34, wherein the conversion includes encoding the visual data into the at least one bitstream.

Clause 36. The method of any of clauses 1-34, wherein the conversion includes decoding the visual data from the at least one bitstream.

Clause 37. An apparatus for visual data processing comprising a processor and a non-transitory memory with instructions thereon, wherein the instructions upon execution by the processor, cause the processor to perform a method in accordance with any of clauses 1-36.

Clause 38. A non-transitory computer-readable storage medium storing instructions that cause a processor to perform a method in accordance with any of clauses 1-36.

Clause 39. A non-transitory computer-readable recording medium storing at least one bitstream of visual data which is generated by a method performed by an apparatus for visual data processing, wherein the method comprises: determining a residual representation of the visual data at least based on a first probability distribution parameter of the visual data and a gain parameter, the residual representation representing a residual value compared to a second probability distribution representation of the visual data, the gain parameter adjusting a value range of the residual representation; and generating the at least one bitstream based on the residual representation.

Clause 40. A method for storing at least one bitstream of visual data, comprising: determining a residual representation of the visual data at least based on a first probability distribution parameter of the visual data and a gain parameter, the residual representation representing a residual value compared to a second probability distribution representation of the visual data, the gain parameter adjusting a value range of the residual representation; generating the at least one bitstream based on the residual representation; and storing the at least one bitstream in a non-transitory computer-readable recording medium.

Example Device

Figure 10:
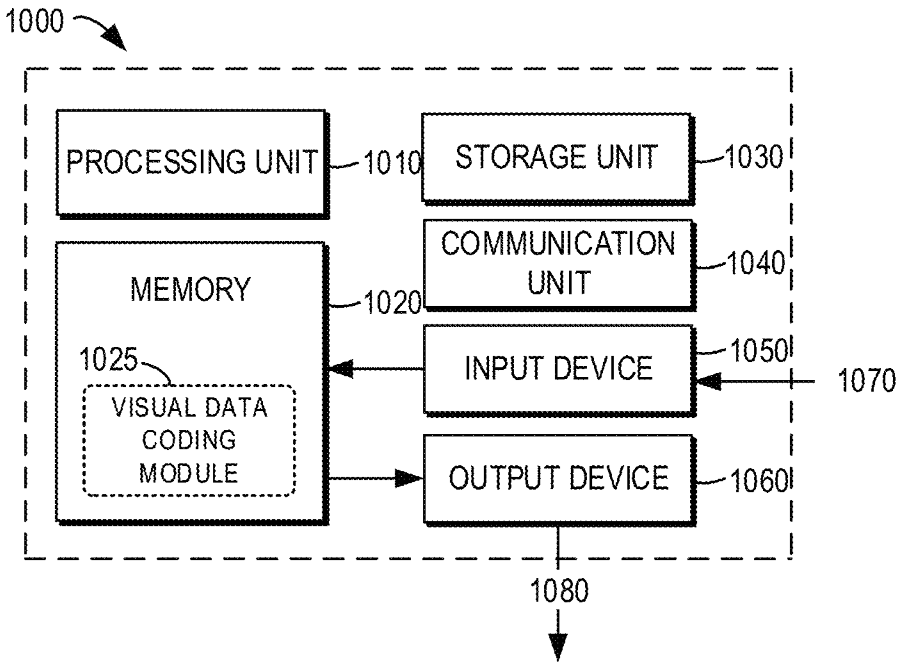
FIG. 10 illustrates a block diagram of a computing device in which various embodiments of the present disclosure can be implemented.

FIG. 10 illustrates a block diagram of a computing device 1000 in which various embodiments of the present disclosure can be implemented. The computing device 1000 may be implemented as or included in the source device 110 (or the data encoder 114 or 200) or the destination device 120 (or the data decoder 124 or 300).

It would be appreciated that the computing device 1000 shown in FIG. 10 is merely for purpose of illustration, without suggesting any limitation to the functions and scopes of the embodiments of the present disclosure in any manner.

As shown in FIG. 10, the computing device 1000 includes a general-purpose computing device 1000. The computing device 1000 may at least comprise one or more processors or processing units 1010, a memory 1020, a storage unit 1030, one or more communication units 1040, one or more input devices 1050, and one or more output devices 1060.

In some embodiments, the computing device 1000 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 1000 can support any type of interface to a user (such as "wearable" circuitry and the like).

The processing unit 1010 may be a physical or virtual processor and can implement various processes based on programs stored in the memory 1020. In a multi-processor system, multiple processing units execute computer executable instructions in parallel so as to improve the parallel processing capability of the computing device 1000. The processing unit 1010 may also be referred to as a central processing unit (CPU), a microprocessor, a controller or a microcontroller.

The computing device 1000 typically includes various computer storage medium. Such medium can be any medium accessible by the computing device 1000, including, but not limited to, volatile and non-volatile medium, or detachable and non-detachable medium. The memory 1020 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1030 may be any detachable or non-detachable medium and may include a machine-readable medium such as a memory, flash memory drive, magnetic disk or another other media, which can be used for storing information and/or data and can be accessed in the computing device 1000.

The computing device 1000 may further include additional detachable/non-detachable, volatile/non-volatile memory medium. Although not shown in FIG. 10, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1040 communicates with a further computing device via the communication medium. In addition, the functions of the components in the computing device 1000 can be implemented by a single computing cluster or multiple computing machines that can communicate via communication connections. Therefore, the computing device 1000 can operate in a networked environment using a logical connection with one or more other servers, networked personal computers (PCs) or further general network nodes.

The input device 1050 may be one or more of a variety of input devices, such as a mouse, keyboard, tracking ball, voice-input device, and the like. The output device 1060 may be one or more of a variety of output devices, such as a display, loudspeaker, printer, and the like. By means of the communication unit 1040, the computing device 1000 can further communicate with one or more external devices (not shown) such as the storage devices and display device, with one or more devices enabling the user to interact with the computing device 1000, or any devices (such as a network card, a modem and the like) enabling the computing device 1000 to communicate with one or more other computing devices, if required. Such communication can be performed via input/output (I/O) interfaces (not shown).

In some embodiments, instead of being integrated in a single device, some or all components of the computing device 1000 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1000 may be used to implement visual data encoding/decoding in embodiments of the present disclosure. The memory 1020 may include one or more visual data coding modules 1025 having one or more program instructions. These modules are accessible and executable by the processing unit 1010 to perform the functionalities of the various embodiments described herein.

In the example embodiments of performing visual data encoding, the input device 1050 may receive visual data as an input 1070 to be encoded. The visual data may be processed, for example, by the visual data coding module 1025, to generate an encoded bitstream. The encoded bitstream may be provided via the output device 1060 as an output 1080.

In the example embodiments of performing visual data decoding, the input device 1050 may receive an encoded bitstream as the input 1070. The encoded bitstream may be processed, for example, by the visual data coding module 1025, to generate decoded visual data. The decoded visual data may be provided via the output device 1060 as the output 1080.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for visual data processing, comprising:

determining, for a conversion between at least one bitstream of visual data and the visual data, a residual representation of the visual data at least based on a first probability distribution parameter of the visual data and at least one gain parameter, the residual representation representing a residual value compared to a second probability distribution representation of the visual data, the at least one gain parameter adjusting a value range of the residual representation; and performing the conversion based on the residual representation, wherein the visual data comprises a luma component and a chroma component, wherein the residual representation of the visual data comprises a luma residual representation corresponding to the luma component and a chroma residual representation corresponding to the chroma component, wherein an inter channel correlation information (ICCI) filter is applied to the chroma component based on the luma component.

2. The method of claim 1, wherein the at least one bitstream comprises a first bitstream and a second bitstream, the first bitstream comprising arithmetic information of the visual data, the second bitstream comprising probability distribution information of the visual data.

3. The method of claim 2, wherein the conversion comprises decoding the visual data from the first and second bitstreams, the at least one gain parameter comprises a first gain parameter, wherein determining the residual representation comprises:

determining the first probability distribution parameter of the visual data based on the second bitstream and at least one model; and obtaining the residual representation of the visual data based on the first bitstream, the first probability distribution parameter and the first gain parameter; and wherein performing the conversion comprises:

determining the visual data at least based on the residual representation of the visual data.

4. The method of claim 3, wherein obtaining the residual representation of the visual data comprises:

determining a first intermediate representation of the residual representation based on the first bitstream, the first probability distribution parameter and a first entropy model; and determining the residual representation by multiplying the first gain parameter to the first intermediate representation, wherein the first intermediate representation comprises a plurality of components associated with a plurality of channels of the first entropy model, and the first gain parameter comprises a plurality of gain components, a number of the plurality of gain components being a same number as a number of the plurality of channels.

5. The method of claim 3, wherein determining the visual data comprises:

determining the second probability distribution representation of the visual data based on a first sample of the visual data and a prediction module;

determining a second sample of the visual data based on the second probability distribution representation of the visual data and the residual representation; and reconstructing the visual data based on the first and second samples and a synthesis model, wherein determining the second probability distribution representation comprises:

determining context information of the visual data based on the first sample and a context module;

determining hyper information of the visual data at least based on the second bitstream and a second entropy model, wherein the hyper information is further determined based on a hyper coder; and determining the second probability distribution representation based on the context information, the hyper information and the prediction module.

6. The method of claim 3, wherein determining the first probability distribution parameter of the visual data comprises:

determining a variance value of the visual data based on the second bitstream and the at least one model, wherein the at least one model comprises a hyper scale coder, the hyper scale coder being not autoregressive; and determining the first probability distribution parameter based on the variance value and a first predefined value, the first predefined value being added or multiplied to the variance value.

7. The method of claim 3, wherein obtaining the residual representation comprises:

determining a second intermediate representation of the visual data based on the first bitstream, the first probability distribution parameter, the first gain parameter; and determining the residual representation based on the second intermediate representation and a second predefined value, the second predefined value being added or multiplied to the second intermediate representation.

8. The method of claim 3, wherein determining the visual data at least based on the residual representation of the visual data comprises:

determining the luma component at least based on the luma residual representation; and determining the chroma component at least based on the chroma residual representation, wherein determining the chroma component comprises:

determining the chroma component based on the chroma residual representation and the luma component, wherein the ICCI filter is applied to the luma component, and the chroma component is determined based on the postprocessed luma component.

9. The method of claim 8, wherein the luma residual representation is determined based on a first luma probability distribution parameter and the first gain parameter, and/or wherein the first luma probability distribution parameter is determined based on a first hyper scale coder.

10. The method of claim 8, wherein the luma component is determined based on the luma residual representation, a first context model and a first prediction module, wherein the luma component is further based on a first hyper coder.

11. The method of claim 8, wherein the chroma residual representation is determined based on a first chroma probability distribution parameter and the first gain parameter, wherein the first chroma probability distribution parameter is determined based on a second hyper scale coder.

12. The method of claim 8, wherein the chroma component is determined based on the chroma residual representation, a second context model and a second prediction module, wherein the chroma component is further based on a second hyper coder.

13. The method of claim 2, wherein the conversion comprises encoding the visual data into the first and second bitstreams, the at least one gain parameter comprises a second gain parameter inverse to a first gain parameter associated with a decoding conversion, and wherein performing the conversion comprises:

determining the first and second bitstreams at least based on the second gain parameter and the residual representation.

14. The method of claim 1, wherein the residual representation comprises a quantized residual representation or a de-quantized residual representation.

15. The method of claim 1, wherein the at least one gain parameter comprises a plurality of gain vectors, a gain vector in the plurality of gain vectors having a plurality of gain components, the visual data comprising a plurality of components associated with a plurality of channels, a number of the plurality of gain components being a same number as a number of the plurality of channels, wherein a third gain vector is determined based on a convolution of a first gain vector and a second gain vector in the plurality of gain vectors.

16. The method of claim 1, wherein the conversion includes encoding the visual data into the at least one bitstream, and/or wherein the conversion includes decoding the visual data from the at least one bitstream.

17. An apparatus for visual data processing comprising a processor and a non-transitory memory with instructions thereon, wherein the instructions upon execution by the processor, cause the processor to:

determine, for a conversion between at least one bitstream of visual data and the visual data, a residual representation of the visual data at least based on a first probability distribution parameter of the visual data and at least one gain parameter, the residual representation representing a residual value compared to a second probability distribution representation of the visual data, the at least one gain parameter adjusting a value range of the residual representation; and perform the conversion based on the residual representation, wherein the visual data comprises a luma component and a chroma component, wherein the residual representation of the visual data comprises a luma residual representation corresponding to the luma component and a chroma residual representation corresponding to the chroma component, wherein an inter channel correlation information (ICCI) filter is applied to the chroma component based on the luma component.

18. A non-transitory computer-readable storage medium storing instructions that cause a processor to:

determine, for a conversion between at least one bitstream of visual data and the visual data, a residual representation of the visual data at least based on a first probability distribution parameter of the visual data and at least one gain parameter, the residual representation representing a residual value compared to a second probability distribution representation of the visual data, the at least one gain parameter adjusting a value range of the residual representation; and perform the conversion based on the residual representation, wherein the visual data comprises a luma component and a chroma component, wherein the residual representation of the visual data comprises a luma residual representation corresponding to the luma component and a chroma residual representation corresponding to the chroma component, wherein an inter channel correlation information (ICCI) filter is applied to the chroma component based on the luma component.

19. A method for storing at least one bitstream of visual data, comprising:

determining a residual representation of the visual data at least based on a first probability distribution parameter of the visual data and at least one gain parameter, the residual representation representing a residual value compared to a second probability distribution representation of the visual data, the at least one gain parameter adjusting a value range of the residual representation;

generating the at least one bitstream based on the residual representation; and storing the at least one bitstream in a non-transitory computer-readable recording medium, wherein the visual data comprises a luma component and a chroma component, wherein the residual representation of the visual data comprises a luma residual representation corresponding to the luma component and a chroma residual representation corresponding to the chroma component, wherein an inter channel correlation information (ICCI) filter is applied to the chroma component based on the luma component.

* * * * *